(12) United States Patent
Kurokawa et al.

(10) Patent No.: US 7,588,009 B2
(45) Date of Patent: Sep. 15, 2009

(54) LAYOUT STRUCTURE OF A FUEL INJECTION DEVICE IN A MOTOR CYCLE

(75) Inventors: Masaya Kurokawa, Saitama (JP); Tomoharu Kawano, Saitama (JP); Eiichi Ishikawa, Saitama (JP); Toshinao Takigawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 10/847,448

(22) Filed: May 18, 2004

(65) Prior Publication Data

US 2004/0255909 A1 Dec. 23, 2004

(30) Foreign Application Priority Data

Jun. 23, 2003 (JP) ............................. 2003-177574
Mar. 5, 2004 (JP) ............................. 2004-061640

(51) Int. Cl.
*F02M 61/14* (2006.01)
*F02D 9/02* (2006.01)

(52) U.S. Cl. ................................. 123/193.5; 123/90.27

(58) Field of Classification Search .............. 123/193.5, 123/193.3, 90.27
See application file for complete search history.

(56) References Cited

U.S. PATENT DOCUMENTS

| | | | |
|---|---|---|---|
| 3,096,750 A * | 7/1963 | Dolza et al. | ............... 123/90.27 |
| 3,738,338 A | 6/1973 | Wickman | |
| 4,915,188 A * | 4/1990 | Ota et al. | ................. 180/219 |
| 4,964,381 A | 10/1990 | Shiozaki et al. | |
| 5,022,371 A | 6/1991 | Daly | |
| 5,094,212 A * | 3/1992 | Kawaguchi et al. | ......... 123/470 |
| 5,564,383 A | 10/1996 | Isaka et al. | |
| 6,196,186 B1 | 3/2001 | Nagasaka et al. | |
| 6,830,038 B2 * | 12/2004 | Yamashita et al. | ........... 123/493 |
| 7,028,669 B2 * | 4/2006 | Nagashii et al. | ............. 123/470 |
| 7,086,364 B2 * | 8/2006 | Udono | ................... 123/184.21 |
| 2003/0037761 A1 | 2/2003 | Katayama | |
| 2003/0041827 A1 | 3/2003 | Ito et al. | |
| 2004/0251657 A1* | 12/2004 | Kan et al. | ................. 280/304.3 |

FOREIGN PATENT DOCUMENTS

| | | |
|---|---|---|
| EP | 0 745 767 A2 | 12/1996 |
| JP | 11-245894 A | 9/1999 |
| JP | 2995198 B2 | 10/1999 |

* cited by examiner

*Primary Examiner*—M. McMahon
(74) *Attorney, Agent, or Firm*—Birch, Stewart, Kolasch & Birch, LLP

(57) ABSTRACT

In a motorcycle, the vehicle body frame includes main frames which are inclined rearwardly and downwardly directly towards a rear portion of a vehicle body from a head pipe with the engine being arranged close to an inclined portion of the vehicle body frame and the fuel injection device is overlapped to the main frames. In a fuel injection type engine including a cylinder head, a throttle body has an intake passage leading to an intake port and a fuel injection valve which injects fuel towards the intake port, the throttle body can be arranged close to a cylinder head and, at the same time, the fuel injection valve can be cooled effectively. A connecting sleeve portion projects further outwardly relative to a joint portion of a cylinder head and a head cover and forms an inlet portion of an intake port that is integrally formed with the cylinder head.

22 Claims, 14 Drawing Sheets

US 7,588,009 B2

LAYOUT STRUCTURE OF A FUEL INJECTION DEVICE IN A MOTOR CYCLE

CROSS-REFERENCE TO RELATED APPLICATIONS

The present application claims priority under 35 U.S.C. § 119 to Japanese Patent Application Nos. 2003-177574 filed on Jun. 23, 2003 and 2003-061640 filed on Mar. 5, 2004 the entire contents thereof are hereby incorporated by reference.

BACKGROUND OF THE INVENTION

1. Field of the Invention

The present invention relates to a layout structure of a fuel injection device for an engine mounted on a motorcycle. More particularly, to an improvement of a fuel injection type engine which includes a cylinder head in which an intake port is formed. A throttle body has an intake passage leading to the intake port in a body thereof and a throttle valve is arranged which is capable of controlling a flow area of the intake passage in the body such that the throttle valve is operable to be opened and closed. A fuel injection valve injects fuel toward the intake port.

2. Description of Background Art

In general, with respect to a vehicle-use engine, there has been proposed a vehicle-use engine which adopts a fuel injection device in place of a carburetor as the fuel supply means from a viewpoint of the enhancement of the accuracy of controlling the fuel, the purification of an exhaust gas, the low fuel consumption or the like. When such a fuel injection type engine is mounted on a motorcycle and the fuel injection device is mounted on a cylinder of the engine, a total height of the engine is increased. Hence, there arises a drawback in that a total height of the motorcycle is increased.

To solve such a drawback, for example, there has been proposed a technique wherein a cylinder of an engine mounted on a motorcycle is inclined toward a vehicle front side and a valve shaft of a fuel injection device is arranged substantially parallel to a cylinder shaft. See, Japanese Patent Publication 2995198.

Here, when the motorcycle is an offroad vehicle, the motorcycle is required to satisfy a more speedy operation to cope with the manipulation demands of a rider. Hence, it is desirable to miniaturize the vehicle as a whole. Thus, the application of the layout structure of the fuel injection device described in Japanese Patent Publication 2995198 to such an offroad vehicle is considered.

In addition, there has been disclosed a fuel injection type engine which mounts a fuel injection valve for injecting fuel toward an intake port of a cylinder head on the cylinder head. See, for example, Japanese Unexamined Patent Publication Hei 11(1999)-245894.

However, in the conventional construction, a valve shaft is provided substantially parallel to the cylinder of the engine. Hence, a large space is formed between a main frame which constitutes a vehicle body frame and the engine. In addition, at the same time, a large space is formed between the fuel injection device and the main frame.

Accordingly, even when such a construction is applied to the offroad vehicle, it is difficult to achieve the further enhancement of the layout efficiency thus giving rise to drawbacks including a drawback that the achievement of the miniaturization of the vehicle is difficult.

SUMMARY AND OBJECTS OF THE INVENTION

Accordingly, it is an object of the present invention to provide a layout structure of a fuel injection device in a motorcycle mounting a fuel injection type engine which can overcome the above-mentioned drawbacks, can enhance the layout efficiency and can prevent a vehicle body from becoming large in size.

Here, with respect to the conventional fuel injection type engine, a throttle body is connected to an intake port of the cylinder head by way of an intake manifold and the intake manifold is formed in a state that the intake manifold is curved or bent in the upward direction in the vicinity of a connecting portion with the intake port. To prevent the interference of the fuel injection valve with the intake manifold, the fuel injection valve is mounted on the cylinder head such that most of the fuel injection valve is embedded in the cylinder head. Accordingly, heat is easily transferred from a fuel combustion chamber to the fuel injection valve. Thus, it is necessary to take heat resistance countermeasures of the fuel injection valve whereby the throttle body has to be arranged at a position relatively remote from the cylinder head thus making the miniaturization of the whole engine also including the throttle body difficult.

The present invention is made in view of such circumstances and it is an object of the present invention to provide a fuel injection type engine which can arrange a throttle body close to a cylinder head and, at the same time, can effectively cool a fuel injection valve.

To achieve the above object, the present invention is directed to a layout structure of a fuel injection device in a motorcycle which mounts an engine having a fuel injection device thereon, wherein a vehicle body frame includes a main frame which is inclined rearwardly and downwardly and is directed towards a rear portion of a vehicle body from a head pipe, the engine is arranged close to an inclined portion of the vehicle body frame, and the fuel injection device is overlapped to the main frame.

According to the present invention, the fuel injection device is overlapped to the main frame. Thus, a large space is hardly formed between the main frame which constitutes the vehicle body frame and the engine whereby the layout efficiency is enhanced leading to the miniaturization of the vehicle body.

In this case, the fuel injection device may be arranged between a cylinder head of the engine and the main frame. Further, the fuel injection device may be arranged relative to the cylinder head of the engine, a throttle body and a main frame. In general, with respect to the engine, in many cases, a width of the cylinder head is smaller than a width of the cylinder block. In such a case, by arranging the fuel injection device in a space which is formed between the cylinder head and the main frame, it is possible to make use of a narrower space more effectively.

Further, a vehicle body cover which has a lowered center portion thereof in the fore-and-aft direction of the vehicle body may be provided to the main frame, and the fuel injection device may be arranged in front of the center portion of the vehicle body cover.

Although the lowered center portion of the vehicle body cover assumes a seating position, by arranging the fuel injection device in front of the center portion, it is possible to set the seating position at a lower position. Thus, the rider can operate the vehicle more freely.

Further, the cylinder head of the engine may be arranged close to an inclined portion of the vehicle body frame at an approximately center portion of the vehicle body, and the fuel injection device may be arranged in a region which is sandwiched by the cylinder head and the inclined portion of the vehicle body frame.

With respect to an offroad vehicle, in many cases, the cylinder head is arranged at approximately the center portion of the vehicle body to bring the center of gravity at a position approximately right below the seating position. However, by further arranging the fuel injection device in the region which is sandwiched by the cylinder head and the inclined portion of the vehicle body frame, it is possible to concentrate parts of the engine at approximately the center portion of the vehicle body and, at the same time, the layout efficiency can be enhanced.

According to the present invention, it is possible to mount the fuel injection type engine while enhancing the layout efficiency and preventing the vehicle body from becoming large in size.

To solve the above-mentioned problems of the prior art, the present invention is directed to a fuel injection type engine which includes a cylinder head in which an intake port is formed with a throttle body which has an intake passage leading to the intake port in a body thereof. The throttle valve is arranged to be capable of controlling a flow area of the intake passage in the body such that the throttle valve is operable to be opened and closed. A fuel injection valve injects fuel toward the intake port, wherein a connecting sleeve portion which projects more outwardly than a joint portion of the cylinder head and a head cover and forms an inlet portion of the intake port is integrally formed with the cylinder head such that an axis of the input portion is arranged on a plane which is substantially orthogonal to a cylinder axis. A mounting hole allows a distal end portion of the fuel injection valve mounted on the cylinder head to inject fuel towards the intake port to be hermetically fitted therein which is formed in the connecting sleeve portion. The throttle body is connected to the connecting sleeve portion by way of an insulator such that an axis of the intake passage is arranged on the plane.

According to the constitution of the present invention, it is possible to expose most of the throttle body except for the distal end portion of the fuel injection valve while arranging the throttle body close to the cylinder head. Thus, the whole engine including the throttle body can be miniaturized whereby the effective cooling of the fuel injection valve can be realized.

Further, the present invention includes an insulator that is formed such that the insulator is bent towards the inside of the plane, and a throttle drum which is arranged outwardly from the body and is integrally rotated with the throttle valve is arranged at a side opposite to the cylinder head. Due to such a constitution, since the insulator is bent, it is possible to arrange the throttle body close to the cylinder head side and, at the same time, there is no possibility that the fuel injection valve obstructs the arrangement of a throttle wire which is wound around the throttle drum.

The present invention provides an intake valve and an exhaust valve which are operable to be opened and closed and are arranged in the cylinder head such that operational axes thereof intersect in an approximate V-shape on a projection view to a plane which includes the cylinder axis and an axis of an inlet portion of the intake port, and a valve actuating device which has an axis substantially parallel to an axis of the inlet portion of the intake port. A camshaft is provided which is arranged between the intake valve and the exhaust valve and is housed in a valve actuating chamber which is formed between the cylinder head and the head cover jointed to the cylinder head. Due to such a constitution, it is possible to decrease a width of an upper portion of the cylinder head as much as possible. Thus, a projecting portion of the fuel injection valve from the cylinder head can be increased whereby it is possible to cool the fuel injection valve more effectively.

The present invention provides a fuel injection type engine that is constituted by a single cylinder in which between a pair of left and right main frames forming a body frame of a small motorcycle, the cylinder head is arranged together with the fuel injection valve and the throttle body. Due to such a construction, it is possible to arrange the fuel injection valve and the throttle body while narrowing a distance between the pair of left and right main frames provided to the small motorcycle and this contributes to the enhancement of saddling property and riding comfortableness of a rider.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment of the present invention is explained in conjunction with attached drawings hereinafter.

Figure 1:
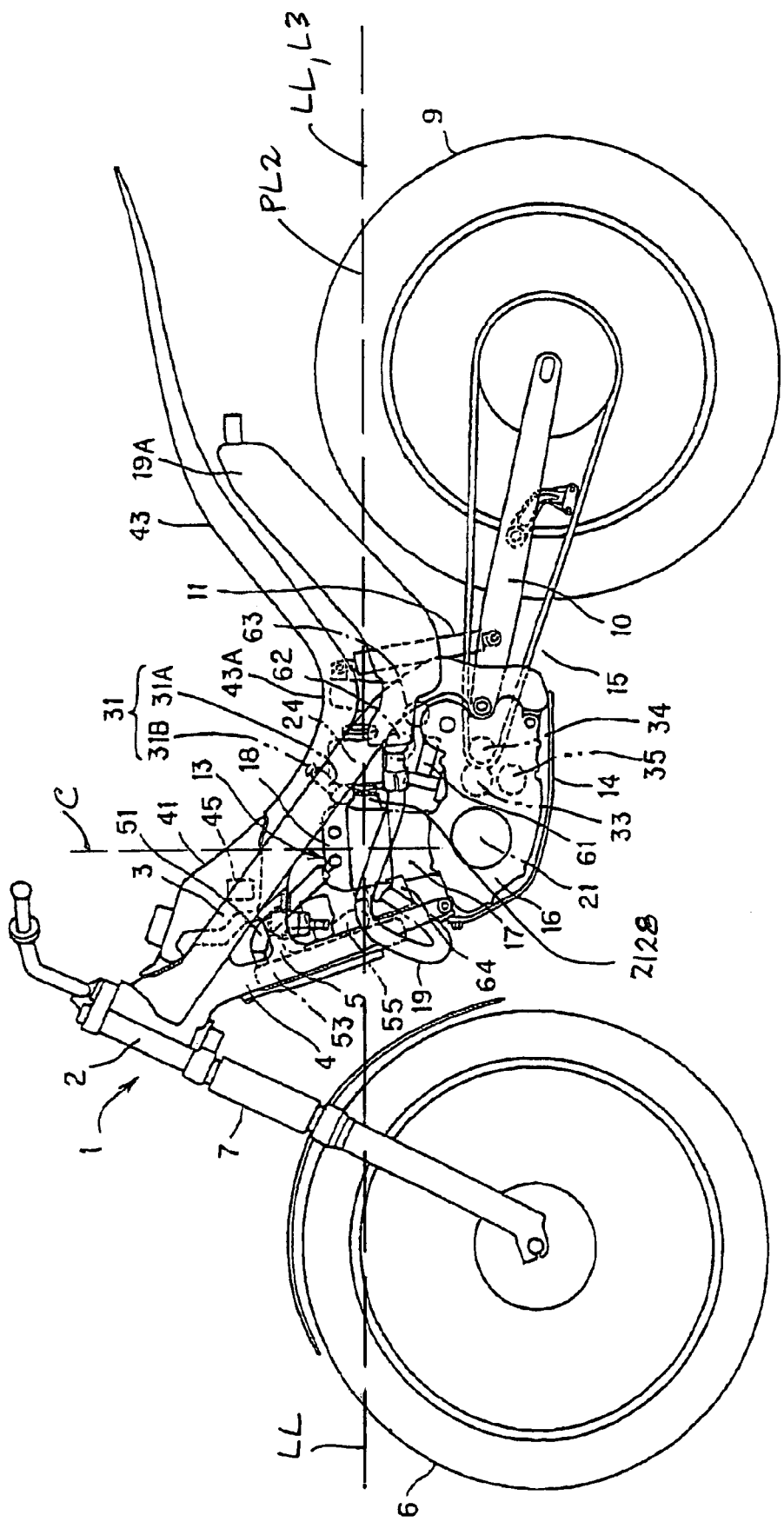
FIG. 1 is a side view of a motorcycle according to the present invention.
Figure 2:
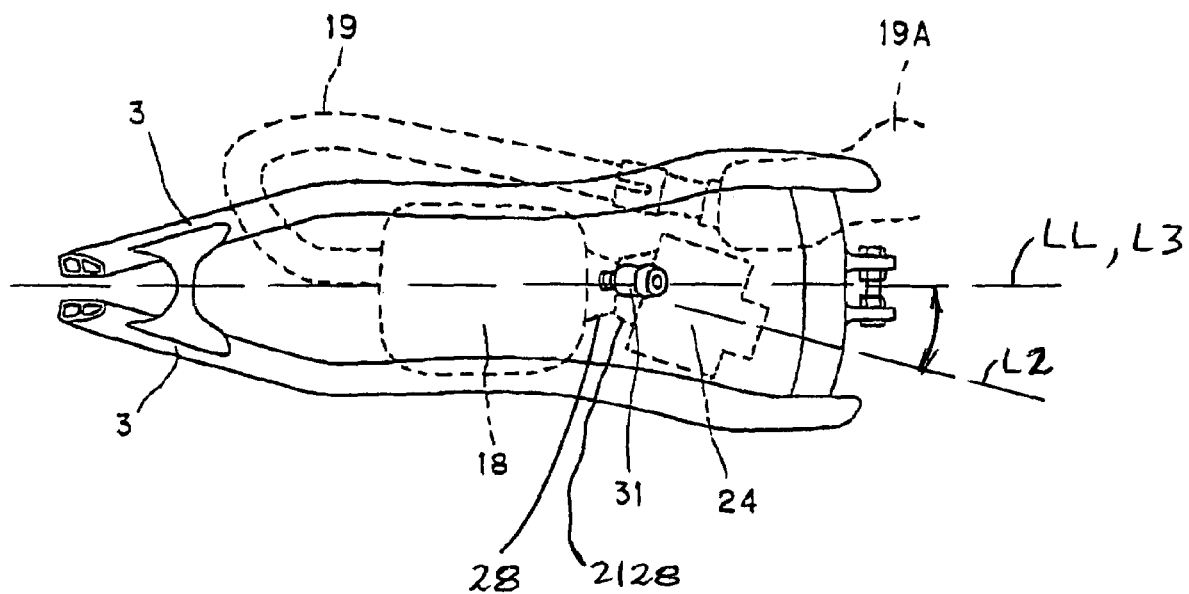
FIG. 2 is a plan view of a vehicle body frame.

FIG. 1 and FIG. 2 show an offroad motorcycle (trial vehicle). This motorcycle includes a vehicle body frame 1, wherein the vehicle body frame 1 includes a head pipe 2 which is arranged at a front end portion of the vehicle body frame 1, a pair of main frames 3 which are directed towards a rear portion of the vehicle body from the head pipe 2 and extend rearwardly and downwardly in an inclined manner while being spaced-apart from each other in the widthwise direction of the vehicle body with a pair of down tubes 4 which extend rearwardly and downwardly in an inclined manner below the main frame 3 at an angle larger than an angle of the main frames 3 while being spaced apart from each other in the widthwise direction of the vehicle body, and a connecting portion 5 which connects these main frames 3 and the down tubes 4.

A front fork 7 for supporting a front wheel 6 is connected to the head pipe 2 such that the front fork 7 can be steered. A rear fork 10 which supports a rear wheel 9 is connected to lower end portions of the main frames 3 such that the rear fork 10 can be tilted vertically. A rear cushion 11 is interposed between the rear fork 10 and the vehicle body frame 1.

A fuel tank 41 is mounted on an upper half portion of the main frames 3 and a fuel pump 45 is mounted on the fuel tank 41. Further, contiguously with the fuel tank 41, on an upper portion of a lower half portion of the main frames 3, a vehicle body cover 43 which lowers a center portion 43A thereof in the fore-and-aft direction of the vehicle body 1 is arranged.

Figure 3:
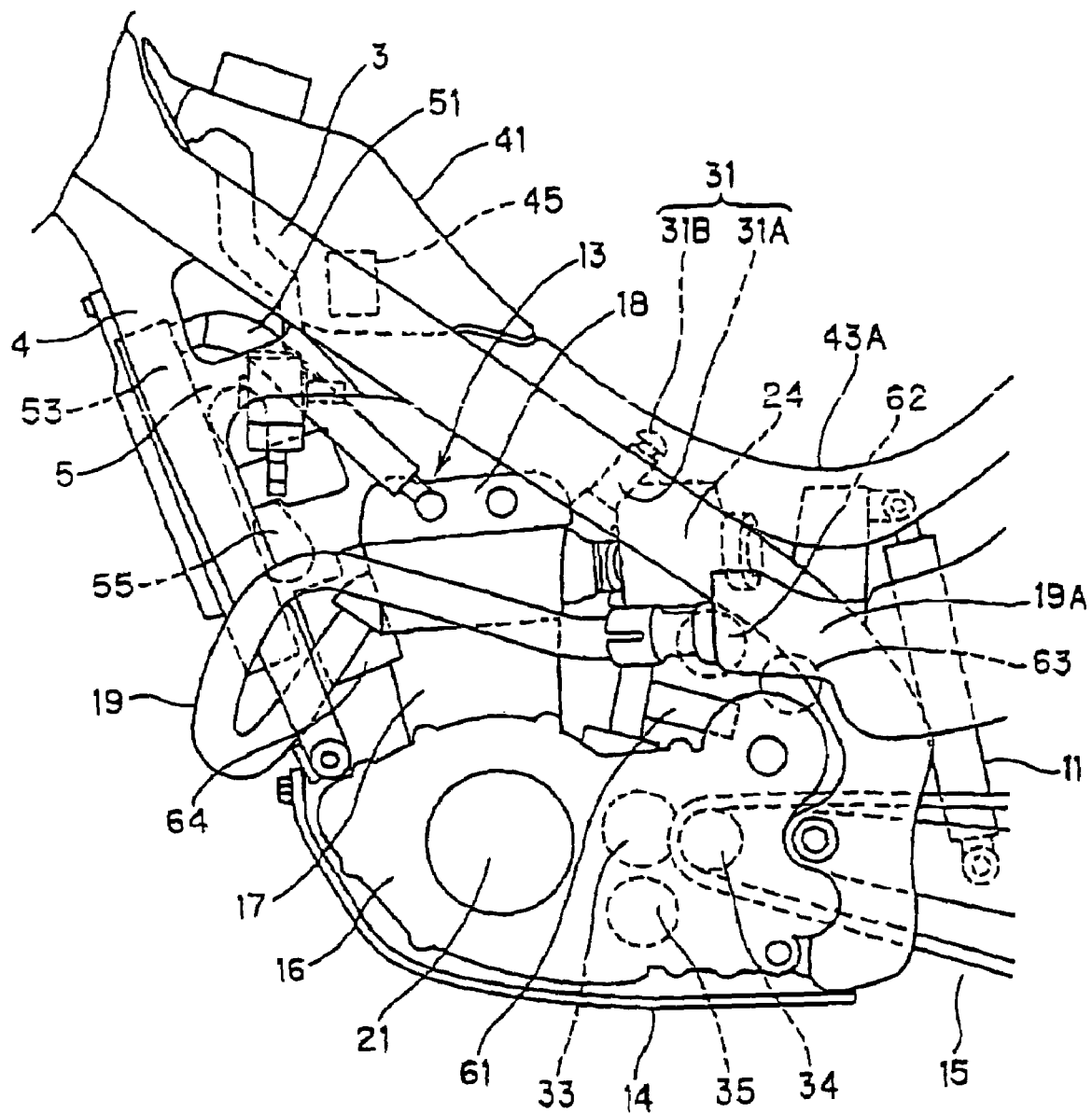
FIG. 3 is a view showing the vehicle body frame in an enlarged manner.

Between the main frames 3 and the down tubes 4, as shown in FIG. 3, a single-cylinder 4-cycle engine 13 is mounted by way of a plurality of brackets such that the engine 13 is arranged close to the an inclined portion (main frames 3) of the vehicle body frame 1, wherein the engine 13 has a lower surface thereof covered with an engine guard 14. Power from the engine 13 is transmitted to the rear wheel 9 by way of a chain transmission device 15. See, FIG. 1. The engine 13 includes a cylinder block 16, a cylinder 17 and a cylinder head 18. An exhaust pipe 19 is connected to a front side of the cylinder head 18 and the exhaust pipe 19 extends towards a rear portion of the vehicle body along the left side of the engine 13 and is connected to a muffler 19A.

Figure 4:
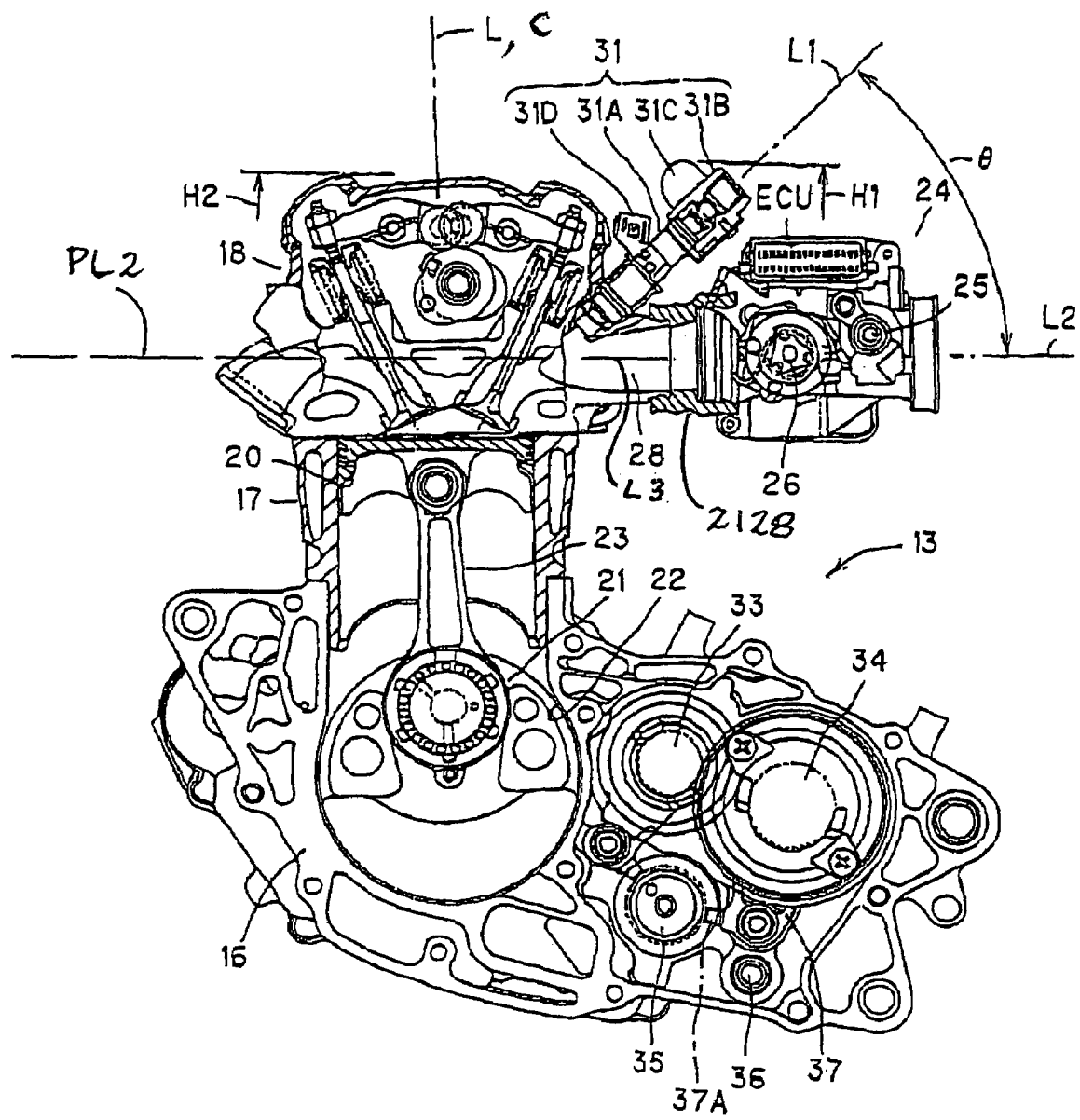
FIG. 4 is a cross-sectional view of an engine.
Figure 5:
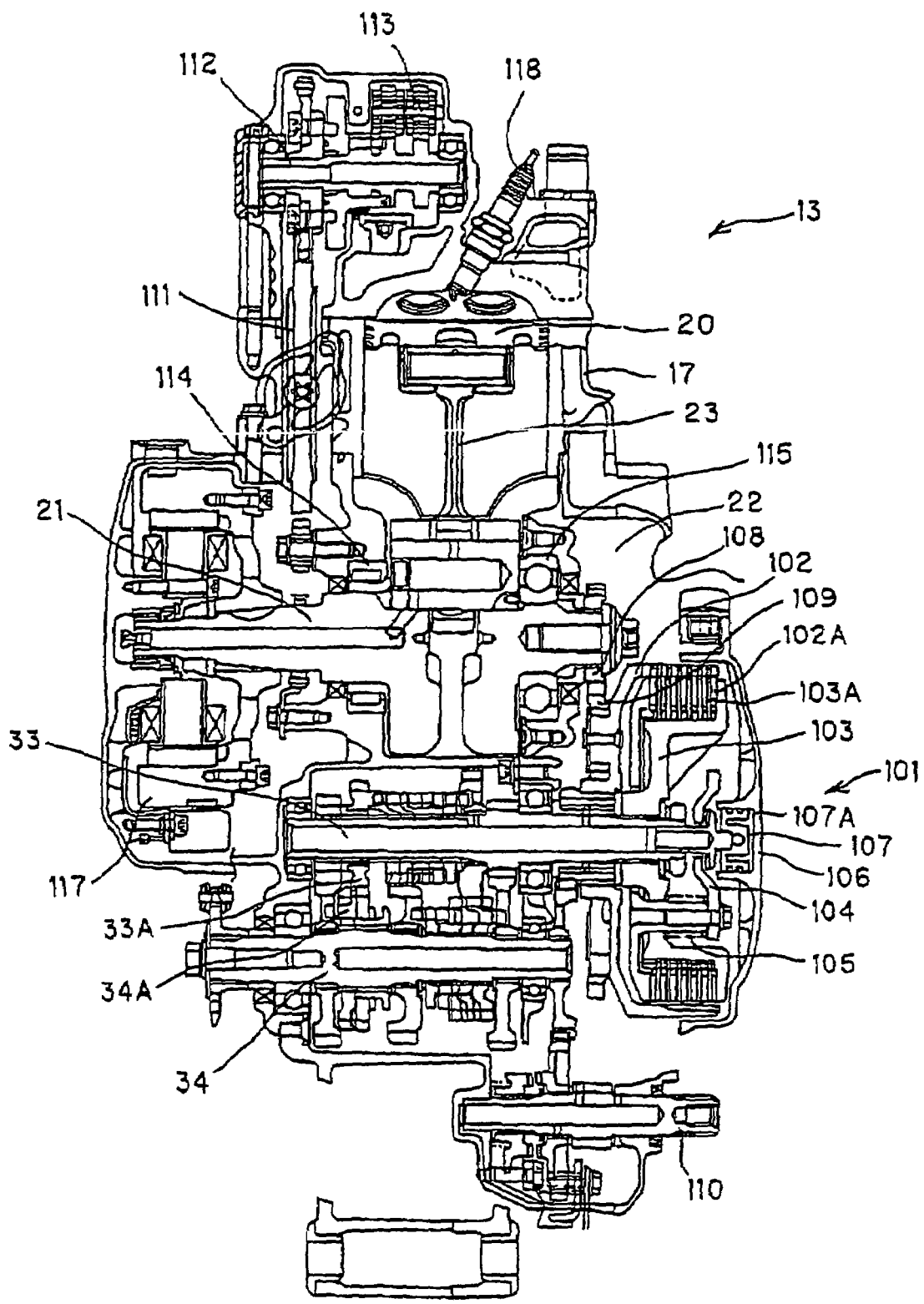
FIG. 5 is a cross-sectional view of the same engine.

As shown in FIGS. 4 and 5, a piston 20 is slidably mounted in the cylinder 17, the piston 20 is connected to a crankshaft 21 by way of a connecting rod 23, and the crankshaft 21 is pivotally supported on a crankcase 22.

Further, to a rear side of the cylinder head 18, as shown in FIG. 4, a throttle body 24 is connected substantially orthogonal to an axis L of the cylinder 17. Purified air for combustion is supplied to the throttle body 24 by way of an air cleaner omitted from the drawing.

The throttle body 24 includes an idling adjustment screw 25 and a throttle valve 26. At the time of conducting the idling adjustment, when the screw 25 is rotated in the right direction, for example, the degree of opening of the throttle valve 26 is increased. Thus, an air supply rate is increased whereby a rotational speed of the engine is elevated. On the other hand, when the screw 25 is rotated in the left direction, the degree of opening of the throttle valve 26 is decreased and hence, the air supply rate is decreased whereby the rotational speed of the engine is lowered.

A downstream portion of the throttle valve 26 faces an intake passage 28 of the cylinder head 18 and an injector (fuel injection device) 31 faces the intake passage 28.

As can be seen in FIGS. 1, 2, and 4, each of the intake passage 28, the insulator 2128, and the throttle body 24 has an axis that is arranged on a plane PL2 which is substantially in a horizontal direction, the axis L3 of the intake passage extends in a direction which is parallel to a lengthwise direction LL of the motorcycle, and the axis L2 of the throttle body 24 extends in a direction at an angle relative to the lengthwise direction LL of the motorcycle. In addition, plane PL2 is substantially orthogonal to cylinder axis C. The injector 31 is directly mounted on the cylinder head 18 such that an axis L1 of the injector 31 makes a given angle (acute angle) θ with respect to an axis L2 of the throttle body 24. In a state wherein the injector 31 is mounted on the cylinder head 18, a height H1 of a top portion of the injector 31 and a height H2 of a top portion of the cylinder head 18 become substantially equal. Thus, a height of the engine 13 becomes a height of the engine 13 on which the injector 31 is not mounted whereby it is possible to suppress the height of the engine to a low value and the vehicle body on which such an engine is mounted can be miniaturized.

The injector 31 is, as shown in FIG. 3, also arranged such that a body 31A thereof is almost completely overlapped to the main frame 3 in the height direction of the vehicle body of the motorcycle. Further, the injector 31 is arranged in a state that a top portion 31B which constitutes a portion of the injector 31 projects above the main frames 3 and the top portion 31B is disposed close to a back surface of a vehicle body cover 43.

According to the construction of this embodiment, the engine 13 is arranged such that the engine 13 is disposed close to the inclined portion of the main frames 3, the injector 31 is directly mounted on the cylinder head 18 and the injector 31 is arranged to be overlapped to the main frame 3. Accordingly, a large space is no longer formed between the main frame 3 and the engine 13. Thus, the layout efficiency is enhanced and the miniaturization of the vehicle body can be realized.

The injector 31 is, as shown in FIG. 2, arranged at approximately the intermediate position between a pair of main frames 3 and, further, in front of a lowered center portion 43A of the vehicle body cover 43. Although the lowered center portion 43A of the vehicle body cover 43 provides the seating position, by arranging the injector 31 in front of the center portion 43A, it is possible to set the seating position at the lower position. Thus, the rider can operate the vehicle more freely.

The injector 31 is, as shown in FIG. 4, provided with a connection opening 31C for a fuel tube and the above-mentioned fuel pump 45, see FIG. 1, is connected to the connection opening 31C, wherein fuel is supplied to the injector 31 through the fuel pump 45.

An electronic control unit ECU is integrally mounted on the throttle body 24 and the electronic control unit ECU is connected to a coupler 31D of the injector 31 by way of a signal cable omitted from the drawing.

The electronic control unit ECU computes a fuel injection quantity of the injector 31 based on, in case of a 4 cycle engine, the degree of opening of the throttle valve 26, the engine rotational speed NE and the like at a rate of one time per two rotations (720°) of the crankshaft 21, for example. Then, the electronic control unit ECU transmits the computed result to the injector 31 and fuel is injected to the intake passage 28 of the cylinder head 18 through the injector 31 for a period corresponding to the fuel injection quantity.

On the crankcase 22, as shown in FIG. 4 and FIG. 5, besides the crankshaft 21, a main shaft 33, a counter shaft 34, a shift drum 35, a shift spindle 36 and a shift fork 37 are supported. A constant-mesh gear speed reduction device is provided by these components. Here, a rotational force of the crankshaft 21 is transmitted to or is interrupted from the main shaft 33 by way of a friction-type multi-disc clutch 101.

The crankshaft 21 has both ends thereof supported by a roller bearing 114 and a radial ball bearing 115.

The multi-disc clutch 101 is arranged coaxially with the main shaft 33 and is constituted of a clutch outer 102 having clutch discs 102A, a clutch center 103 having clutch plates 103A, a pressure plate 103A which is movable in the axial direction to perform the clutch connection by pushing the clutch plates 103A to the clutch discs 102A, a plurality of clutch springs 105 which bias the pressure plate 104 in the clutch connecting direction, and a clutch release mechanism 106 which moves the pressure plate 104 in the clutch connection releasing direction.

The clutch releasing mechanism 106 includes a release cylinder 107 and a space portion 107A which is formed in the inside of the release cylinder 107 and is filled with oil is in communication with an oil cylinder which is, in turn, is connected to a clutch lever (not shown in the drawing).

A kicking shaft 110 is provided together with a cam chain 111, a cam shaft 112 and a rocker shaft 113.

The gear 108 is fixed to a shaft end of the crankshaft 21 at a multi-disc clutch 101 side and the gear 108 is meshed with a gear 109 which is fixed to the clutch outer 102 of the multi-disc clutch 101. Accordingly, when the crankshaft 21 is rotated, the clutch outer 102 is always rotated by way of the gears 108, 109.

At the time of establishing the clutch connection, the clutch lever (not shown in the drawing) is manipulated and the oil filled in the space portion 107A leaks to the oil cylinder side which is connected to the clutch lever. Then, due to a biasing force of the clutch spring 105, the pressure plate 104 moves in the right direction in the drawing and the clutch discs 102A are brought into pressure contact with the clutch plates 103A and hence, the rotational force of the clutch outer 102 is transmitted to the main shaft 33 by way of the clutch center 103. On the other hand, at the time of releasing the clutch connection, the clutch lever (not shown in the drawing) is manipulated and the oil is filled into the space portion 107A of the release cylinder 107. Thus, the pressure inside the space portion 107A is increased whereby the pressure plate 104 moves in the left direction in the drawing. Accordingly, the pressure contact state between the clutch discs 102A and the clutch plates 103A is released. Thus, the clutch center 103 performs idling whereby the transmission of power to the main shaft 33 is interrupted.

The rotational force which is transmitted to the main shaft 33 from the crankshaft 21 is subjected to a speed reduction such as a first speed, a second speed or a third speed, for example, by way of the gear speed reduction device and is, thereafter, transmitted to the counter shaft 34. Then, the rotational force is transmitted to an output shaft (not shown in the drawing) which is connected with the counter shaft 34 by way of gears. Thereafter, the rotational force is transmitted to the rear wheel 9 from the output shaft by way of a chain transmission device 15 as the power of the engine 13.

For example, when a speed reduction with respect to the first speed, the second speed or the third speed, for example, is performed, a change pedal (not shown in the drawing) mounted on the crankcase of the motorcycle is manipulated.

In manipulating the change pedal, prior to this manipulation, first of all, the clutch lever (not shown in the drawing) is manipulated so that the communication between the crankshaft 21 and the main shaft 33 is interrupted by way of the multi-disc clutch 101.

Next, in this interrupted state, the change pedal is manipulated. The change pedal is connected with a shift spindle 36 shown in FIG. 4. When the change pedal is manipulated, the shift spindle 36 is rotated. Being interlocked with this rotation, a shift drum 35 is rotated by way of a gear mechanism (not shown in the drawing). Due to this rotation, any one of shift forks 37 performs a sliding movement in the axial direction by way of the shift pin 37A which is engaged with a groove (not shown in the drawing) of the shift drum 35, and the operated shift fork 37 moves any one of the gears 34A, see FIG. 5, on the counter shaft 34 in the axial direction to be meshed with any one of gears 33A, see FIG. 5, on the main shaft 33.

The speed change ratio is determined by the meshing gears. The rotational force which is transmitted from the crankshaft 21 to the main shaft 33 is subject to a speed change with respect to the first speed, the second speed or the third speed in accordance with the speed change ratio and is, thereafter, transmitted to the counter shaft 34. Then, the rotational force is transmitted to the output shaft (not shown in the drawing) connected to the counter shaft 34 by way of gears and is transmitted to the rear wheel 9 from the output shaft by way of a chain transmission device 15 as power from the engine 13.

The engine 13 is a water-cooled engine. Referring to FIG. 1, a water jacket is provided on the cylinder head 18, one end of a pair of hoses 51 are connected thereto while the other end of the respective hoses 51 are connected to a radiator 53 which is supported between the down tubes 4. A radiator fan 55 is provided. Upon driving the engine, a water pump not shown in the drawing is driven and cooling water which cools the engine by way of the water jacket circulates within the radiator 53 and is cooled by wind and then is circulated in the water jacket.

An alternator 117, see FIG. 5, is connected to the engine 13 and two capacitors 62, 63 which have different applications are connected to the alternator 117 by way of a regulator 61. One capacitor 62 is connected to an ignition plug 118, see FIG. 5, of the engine 13 by way of the ignition coil 64 and a voltage which is boosted by the ignition coil 64 is applied to the ignition plug 118. Another capacitor 63 is connected to the above-mentioned injector 31 and fuel pump 45 and is used in a fuel injection system. Two capacitors 62, 63 are arranged such that portions thereof overlap with a lower end portion of the main frame 3 or become coplanar with a lower surface of the lower end portion of the main frame 3. Due to such a construction, the layout efficiency is enhanced. By dividing the capacitor into two capacitors 62, 63, it is possible to perform a control which hardly receives the influence of noises attributed to the ignition coil 64 in the fuel injection system.

According to this embodiment, the injector 31 is directly mounted on the cylinder head 18 of the engine 13 which is arranged close to the inclined portion of the main frames 3, and the injector 31 is arranged such that the injector 31 overlaps with the main frames 3 in the vehicle body height direction. Accordingly, a large space is no longer formed between the main frame 3 and the engine 13. Thus, the layout efficiency is enhanced whereby a miniaturization of the vehicle body can be realized. Usually, with respect to the engine 13, in many cases, a width of the cylinder head 18 is smaller than a width of the cylinder block 16. In such a case, by arranging the injector 31 in the space which is formed between the cylinder head 18 and the main frames 3, it is possible to make use of a narrower space effectively. Further, by arranging the injector 31 in the space which is formed among the cylinder head 18, the throttle body 24 and the main frames 3, it is possible to make use of a narrower space more effectively.

In the above-mentioned construction, although the axis L of the cylinder 17 of the engine 13 is slightly inclined toward the front side of the vehicle body, the axis L is almost directed vertically. Accordingly, there is no possibility that the down tubes 4 which surround the engine 13 will largely project toward the front wheel 6 side. Due to such a construction, even when a suspension stroke of the front fork 7 is set to a large value, it is possible to obviate the interference between the front wheel 6 and the radiator 53 mounted on the down tubes 4.

Figure 6:
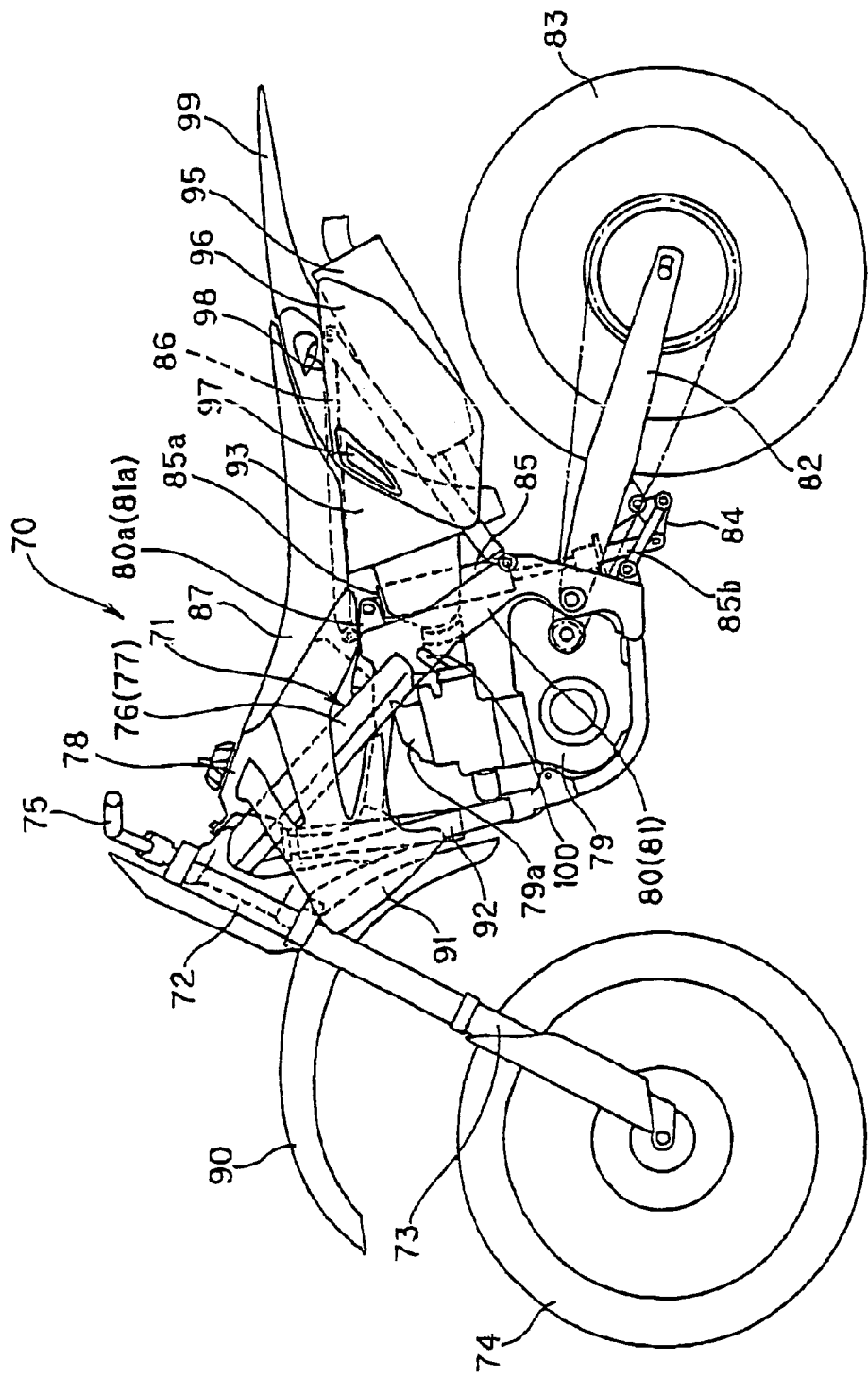
FIG. 6 is a side view showing another embodiment.

FIG. 6 shows the construction of an offroad vehicle.

The offroad vehicle 70 includes a front fork 73 mounted on a head pipe 72 of a vehicle body frame 71, a front wheel 74 supported on the front fork 73 and a handle 75 mounted on the front fork 73. A fuel tank 78 is mounted on an upper portion of a pair of left and right main frames 76, 77 of the vehicle body frame 71, and an engine 79 is provided below the fuel tank 78. Further, a rear swing arm 82 is mounted on a rear end portion, left and right pivot plates 80, 81, of the vehicle body frame 71 and a rear wheel 83 is mounted on a rear portion of the rear swing arm 82.

A link mechanism 84 is mounted in the vicinity of a front end portion of the rear swing arm 82, while a lower portion 85b of a rear shock absorber 85 is mounted on the link mechanism 84. Further, an upper portion 85a of the rear shock absorber 85 is mounted on a rear upper portion, upper portions 81a, 82a of pivot plates 80, 81, of the vehicle body frame 71. Still further, a rear frame 86 is mounted on a rear portion of the vehicle body frame 71 and a seat 87 is mounted on an upper portion of the rear frame 86. A front fender 90 is provided together with a front cowl 91, a radiator 92, an air cleaner 93, a muffler 95, a rear cover 96, a first intake opening 97, a second intake opening 98 and a rear fender 99.

Also in this embodiment, the engine 79 is arranged in the vicinity of the inclined portions of the main frames 76, 77, an injector 100 is directly mounted on the cylinder head 79a of the engine 79 and the injector 100 is arranged to be overlapped to the main frames 76, 77 in the vehicle body height direction.

Accordingly, a large space is no longer formed between the main frames 76, 77 and the engine 79. Thus, it is possible to miniaturize the offroad vehicle 70.

Figure 7:
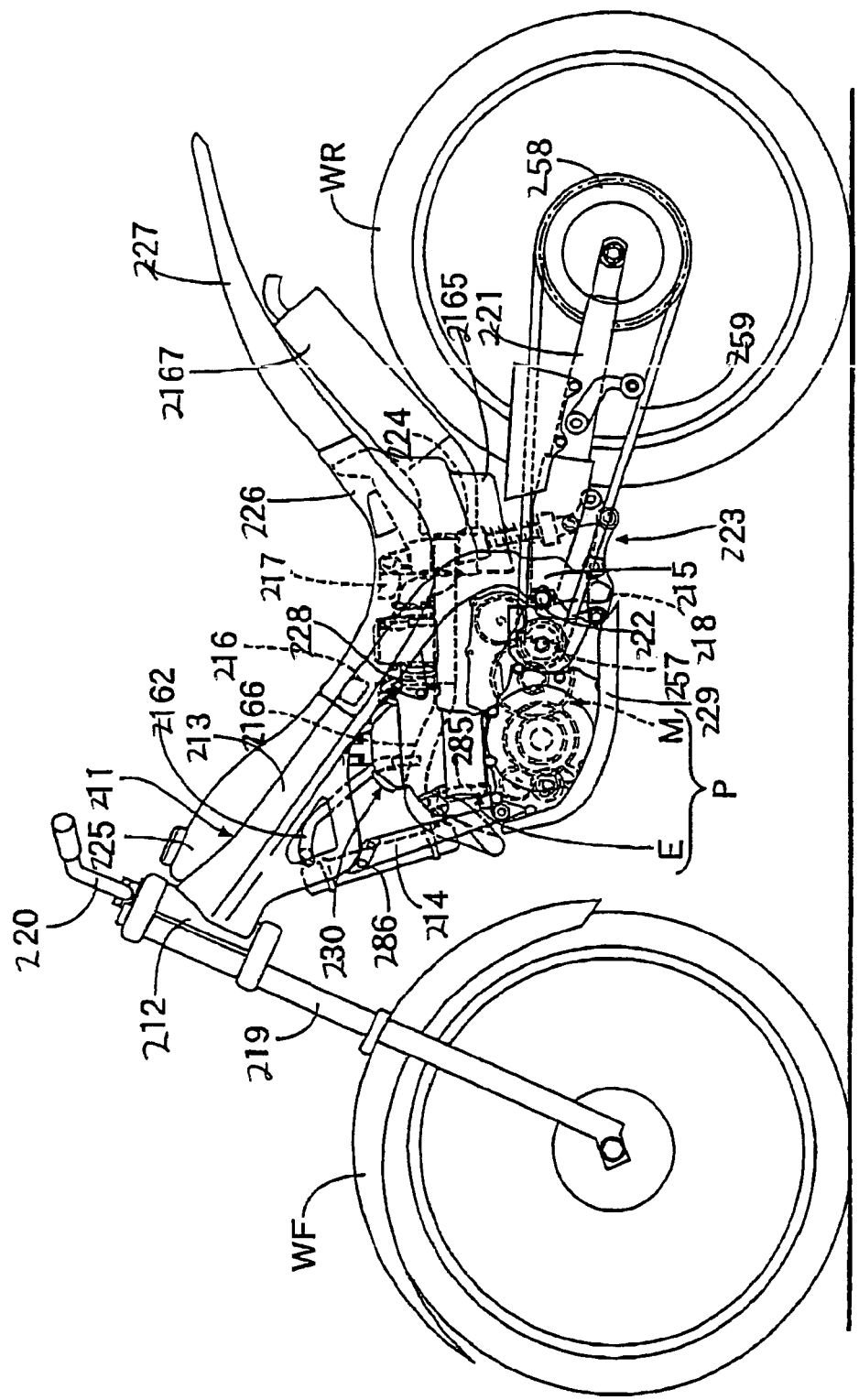
FIG. 7 is a side view of a small motorcycle.
Figure 8:
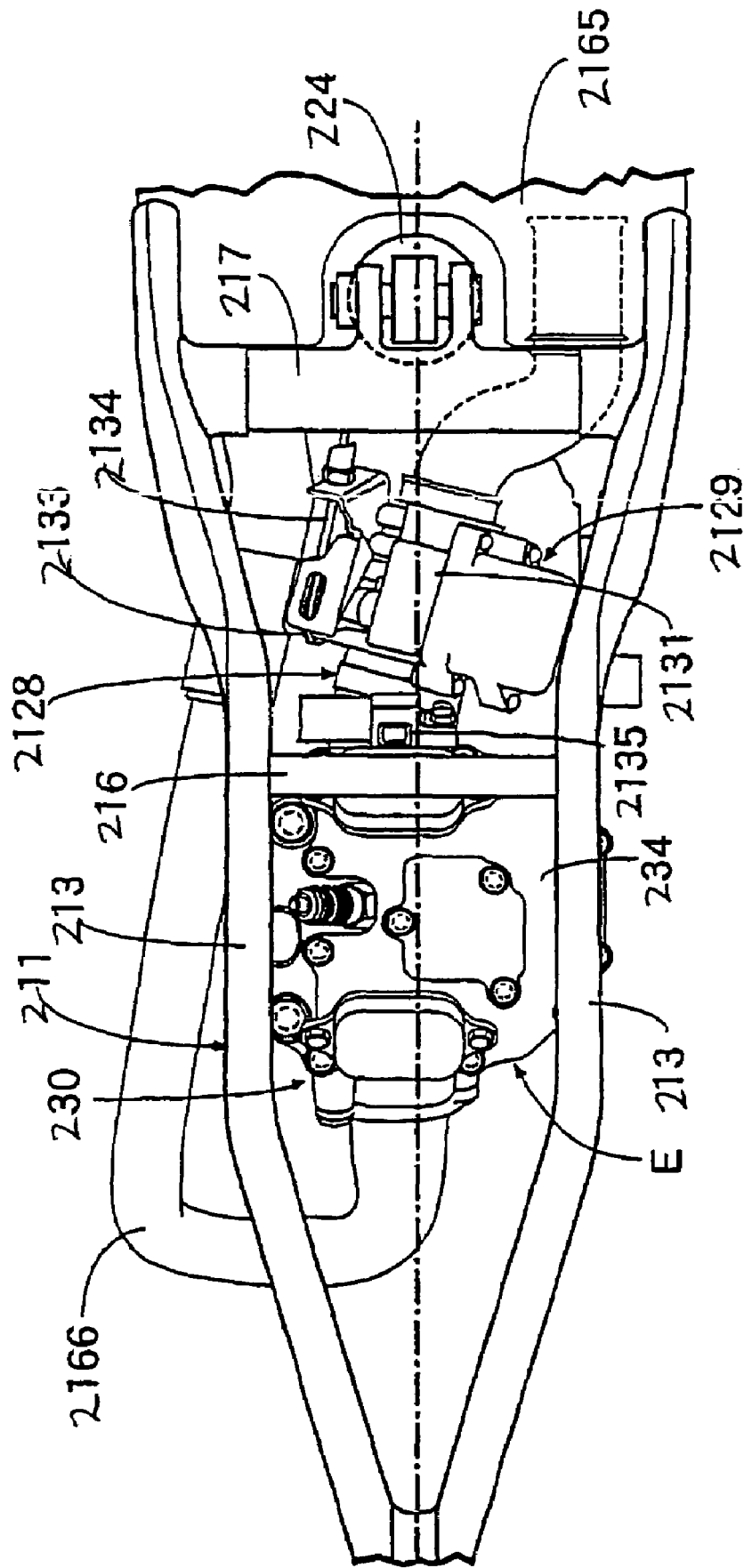
FIG. 8 is a view as viewed from the direction of an arrow 2 in FIG. 7 by omitting a fuel tank and a rider seat.

FIGS. 7-14 show another embodiment of the present invention. As illustrated in FIGS. 7 and 8, a vehicle body frame 211 of a small motorcycle which is used in a trial competition includes a head pipe 212, a pair of left and right main frames 213, 213 which extend rearwardly and downwardly from the head pipe 212, a pair of down tube 214 which respectively extend downwardly from front portions of the main frames 213, a pair of center frames 215 which extend downwardly in a contiguously integrated manner with rear ends of both main frames 213 an intermediate portion cross member 216 which connects intermediate portions of both main frames 213, a rear portion cross member 217 which connects rear portions of both main frames 213, and a lower portion cross member 218 which connects lower portions of both center frames 215.

A front fork 219 which supports a front wheel WF in a steerable manner is supported on a head pipe 212 formed on a front end of the vehicle body frame 211 and a bar-like steering handle 220 is connected to the front fork 219. Further, a front end portion of the rear fork 221 which pivotally supports a rear wheel WR at a rear end portion thereof is vertically tiltably mounted on the pair of left and right center frames 215 by way of a pivot shaft 222. Further, a link mechanism 223 is provided between the lower cross member 218 and the rear fork 221 and a rear cushion 224 is provided between the link mechanism 223 and the rear cross member 217.

A fuel tank 225 is mounted between front portions of the pair of left and right main frames 213, a rider's seat 226 which is arranged behind the fuel tank 225 is supported on the intermediate cross member 216 and the rear cross member 217 and a rear fender 227 is contiguously formed on a rear end of the rider seat 226.

Between the front wheel WF and the rear wheel WR, a power unit P is arranged which includes a water-cooled, fuel-injection-type and single-cylinder 4-cycle engine E and a constant-mesh transmission M. An engine body 230 of the engine E is supported on lower end portions of the pair of left and right down tubes 214 with a hanger plate 228 extending downwardly from the intermediate portions of the main frames 213 and the lower cross member 218. Below the engine body 230, a skid plate 229 is arranged in a state wherein a gap is defined between the skid plate 229 and a lower portion of the engine body 230. The skid plate 229 is mounted on a lower end portion of the down tube 214 . . . and the lower cross member 218.

Figure 9:
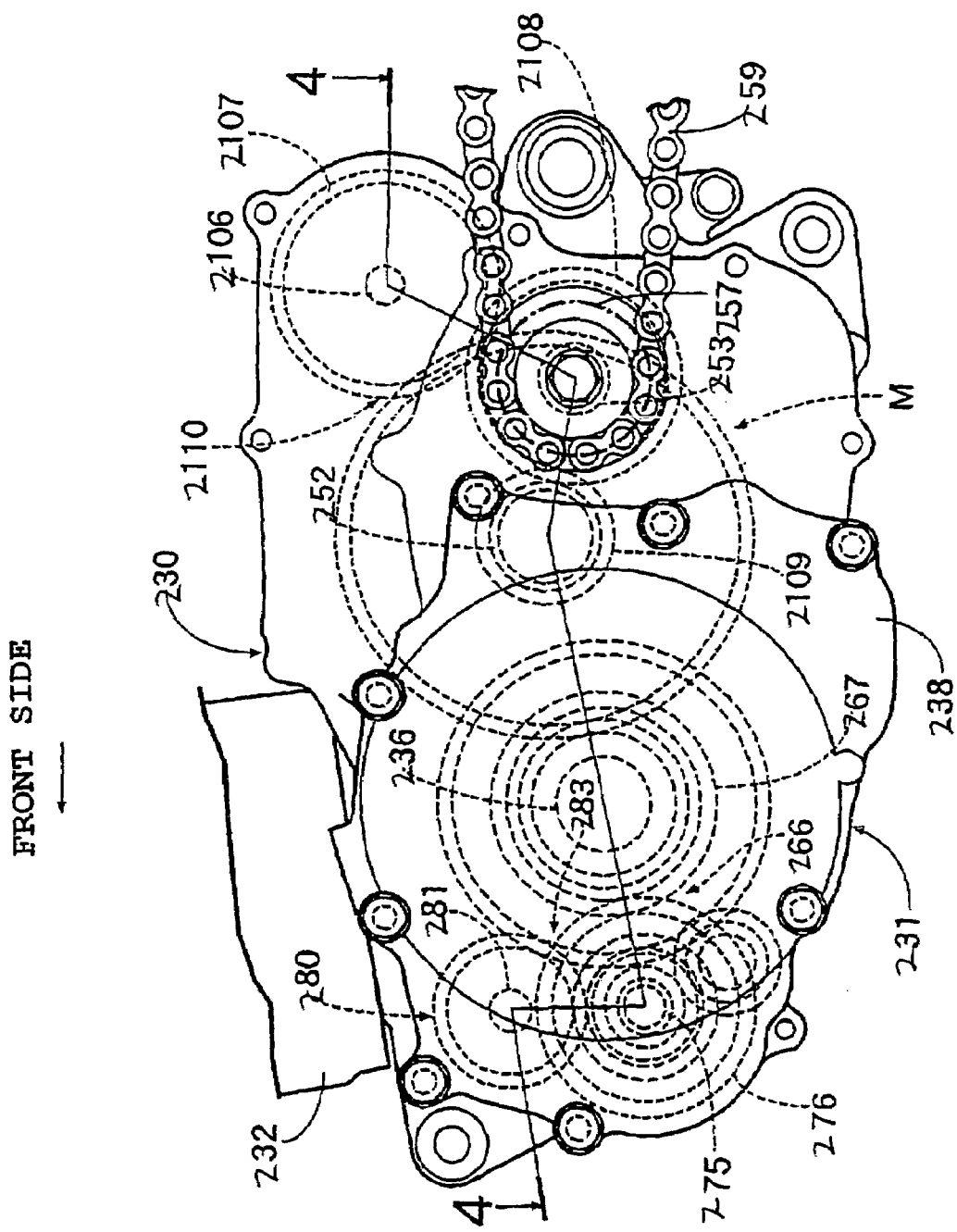
FIG. 9 is a side view of a lower portion of an engine.
Figure 10:
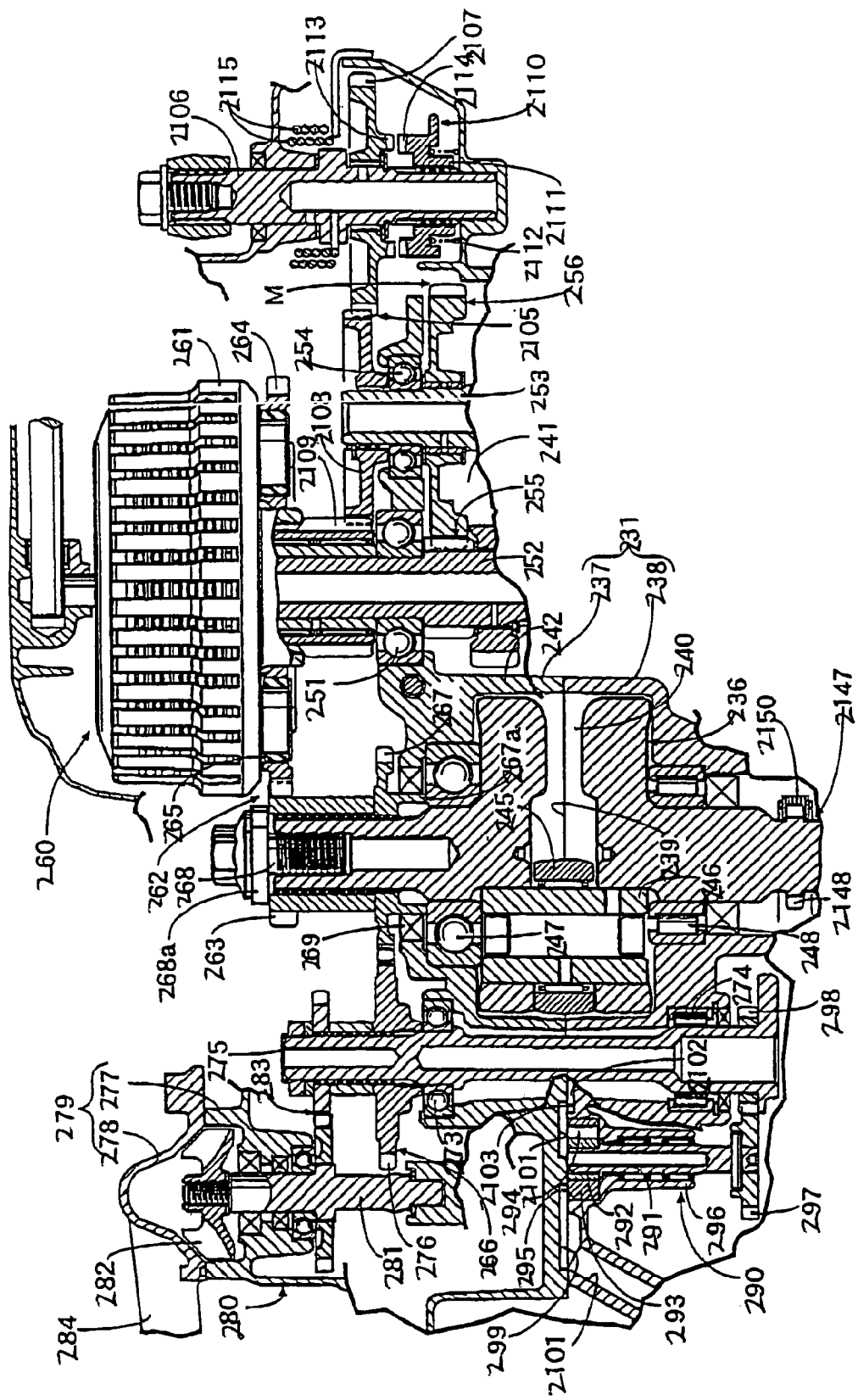
FIG. 10 is a cross-sectional view taken along a line 4-4 in FIG. 9.
Figure 11:
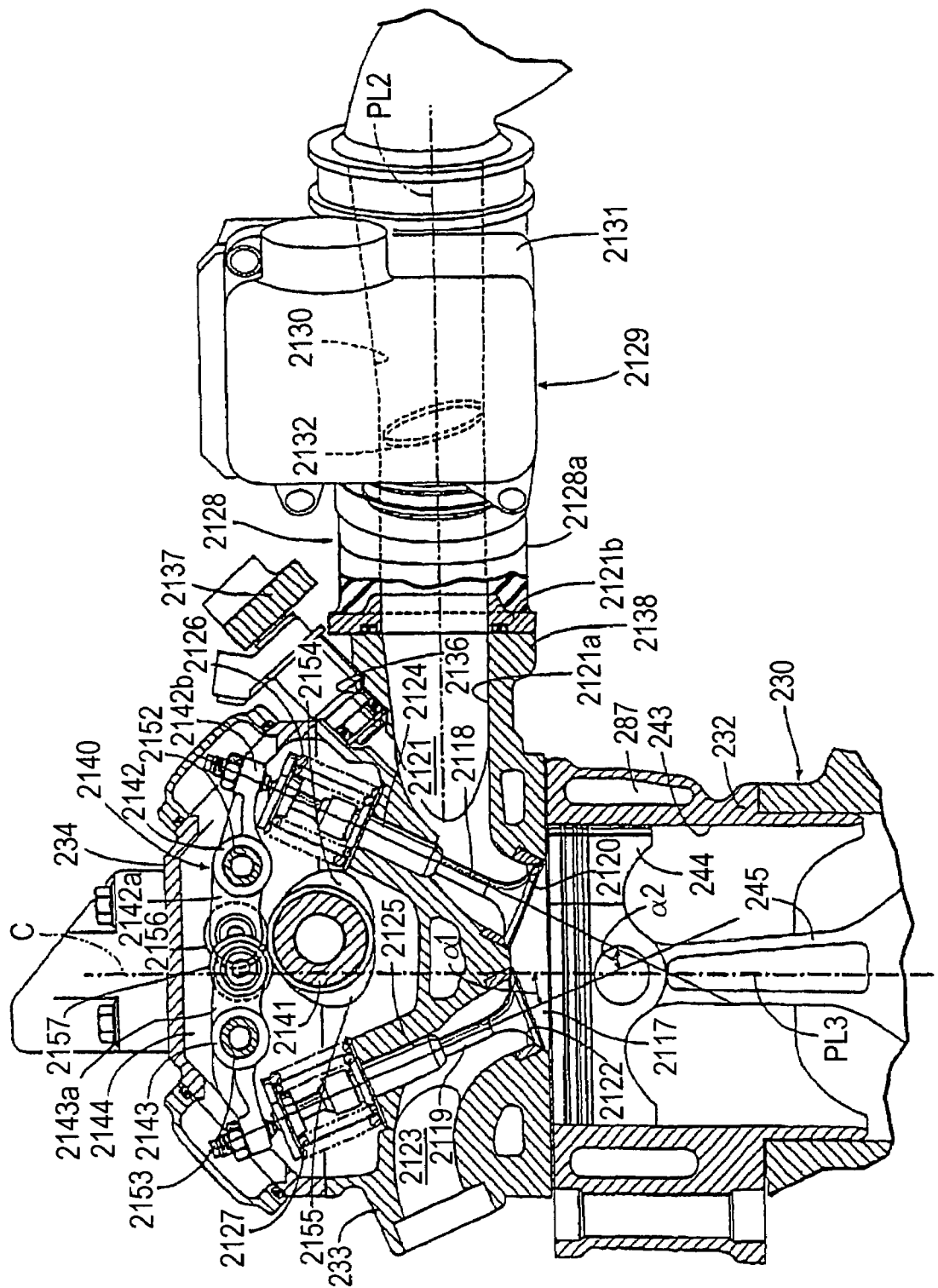
FIG. 11 is a longitudinal cross-sectional side view of an upper portion of the engine.

In FIGS. 9-11, the engine body 230 of the engine E includes a crankcase 231, a cylinder block 232 which is coupled to the crankcase 231, a cylinder head 233 which is coupled to the cylinder block 232 and a head cover 234 which is coupled to the cylinder head 233.

The crankcase 231 rotatably supporting a crankshaft 236 is formed by coupling a right case half 237 which is arranged at the right side at the time of mounting the crankcase 231 on the motorcycle and a left case half 238 which is arranged at the left side at the time of mounting the crankcase 231 on the motorcycle at a mating surface 239 which is arranged along a plane orthogonal to an axis of the crankshaft 236. Further, in the inside of the crankcase 231, a crank chamber 240 housing a main portion of the crankshaft 236 and a mission chamber 241 housing the transmission M are formed in a state wherein these chambers 240, 241 are partitioned from each other by a partition wall 242.

In the inside of the crank chamber 240, a main portion of the crankshaft 236 is housed. A large end portion of a connecting rod 245 is contiguously formed with a piston 244 which is slidably fitted into a cylinder bore 243 formed in the cylinder block 232 is connected to the crankshaft 236 by means of a crankpin 246.

One end portion of the crankshaft 236 rotatably penetrates the right case half 237, while another end portion of the crankshaft 236 rotatably penetrates the left case half 238. A ball bearing 247 is interposed between the right case half 237 and the crankshaft 236 and a roller bearing 248 is interposed between the left case half 238 and the crankshaft 236.

The above-mentioned transmission M includes a main shaft 252 which has an axis parallel to the crankshaft 236 and is rotatably supported on the right and left case halves 237, 238 by way of ball bearings 251 and a counter shaft 253 which has an axis parallel to the main shaft 252 and is rotatably supported on the right and left case halves 237, 238 by way of ball bearings 254. A group of drive gears 255 having a plurality of speed change stages are mounted on the main shaft 252. A group of driven gears 256 which correspond to the group of drive gears 255 are mounted on the counter shaft 253. Here, among the group of drive gears 255 and the group of driven gears 256, due to the selective establishment of gears which correspond to each other, an output of the engine E is subjected to a speed change in a plurality of stages and is, thereafter, transmitted to the counter shaft 253.

Returning back to FIG. 7, on an end portion of the counter shaft 253 which projects from the left case half 238 than the pivot shaft 222 at a front side, a drive sprocket wheel 257 is fixedly mounted, and an endless chain 259 is wound around a driven sprocket wheel 258 which is fixedly mounted on the rear wheel WR and the drive sprocket wheel 257.

On one end portion of the main shaft 252 which projects from the right case half 237, a transmission changeover clutch 260 which changes over the transmission and the interruption of power between the crankshaft 236 and the main shaft 252 is mounted, wherein an input member 261 which the transmission changeover clutch 260 includes is supported on the main shaft 252 such that the input member 261 is rotatable relative to the main shaft 252.

Between the input member 261 of the transmission changeover clutch 260 and the crankshaft 236, a power transmission gear train 262 is provided, wherein the power transmission gear train 262 includes a first drive gear 263 which is fixed to one end portion of the crankshaft 236 and a clutch gear 264 which is meshed with the first drive gear 263. The clutch gear 264 is connected to the input member 261 by way of a damper 265 and is rotated together with the input member 261.

On one end portion of the crankshaft 236, a second drive gear 267 which constitutes a portion of an accessory drive power transmission gear train 266 and the first drive gear 263 are mounted such that the drive gears 267, 263 are brought into contact with each other and the drive gears 267, 263 are mounted on the crankshaft 236 in a relatively non-rotatable manner by a spline fitting or the like. On the second drive gear 267, a sleeve portion 267a which is disposed more inwardly in the axial direction than the second drive gear 267 and is brought into contact with an inner lace surface of the ball bearing 247 which is interposed between the crankshaft 236 and the crankcase 231 is integrally formed in a projecting manner. In an end portion of the crankshaft 236, a bolt 268 having an enlarged diameter head portion 268a which is brought into contact with and is engaged with an outer end of the first drive gear 263 is coaxially threaded.

That is, the cylindrical portion 267a of the second drive gear 267 is sandwiched between the first drive gear 263 and the ball bearing 247, while an annular oil seal 269 is interposed between the sleeve portion 267a and the right case half 237.

The accessory drive power transmission gear train 266 is provided between the crankshaft 236 and a balancer shaft 275 which is rotatably supported on the right case half 237 and left case half 238 by way of the ball bearing 273 and the roller bearing 274 in front of the crankshaft 236, wherein the gear train 266 includes the second drive gear 267 which is fixed to the crankshaft 236 and the first driven gear 276 which is fixed to one end portion of the balancer shaft 275 and is meshed with the second drive gear 267.

Further, above the balancer shaft 275, a water pump 280 having a pump housing 279 is arranged, wherein the pump housing 279 includes a right cover 277 which is coupled to the right case half 237 from the outside and a pump cover 278 which is coupled to an outer surface of the right cover 277. The water pump 280 includes a pump shaft 281 which is arranged parallel to the balancer shaft 275.

The pump shaft 281 hermetically and rotatably penetrates the right cover 277 out of the pump housing 279, wherein a rotary blade 282 is coaxially fixed to one end portion of the pump shaft 281 which projects into the inside of the pump housing 279 and another end portion of the pump shaft 281 is rotatably supported on the right case half 237.

A transmission gear train 283 is provided between one end portion of the balancer shaft 275 and the pump shaft 281. Thus, power which is transmitted to the balancer shaft 275 from the crankshaft 236 by way of the accessory drive power transmission gear train 266 is transmitted to the pump shaft 281 by way of the transmission gear train 283.

A water return pipe 284 is mounted on the pump cover 278 in the pump housing 279 of the water pump 280, while a hose 285, see FIG. 7, which is arranged in front of the engine body 230 and guides water from a radiator 286 supported on both down tubes 214 of the vehicle body frame 211 is connected to the water return tube 284. Further, water discharged from the water pump 280 is supplied to a cooling jacket 287 which is in communication with the water pump 280 mutually and is formed on the cylinder block 232 and the cylinder head 233 by way of the crankcase 231.

Oil stored in the inside of the crankcase 231 is pumped out by an oil pump 290, wherein the oil pump 290 adopts a trochoid structure which includes an inner rotor 292 fixed to an inner end of the pump shaft 291 and an outer rotor 293 which is meshed with the inner rotor 292.

A pump chamber 294 which houses the inner rotor 292 and the outer rotor 293 is formed of a housing recessed portion 295 which is formed in the left case half 238 in a state wherein the housing recessed portion 295 faces the mating surface 239 and the right case half 237, wherein the mating surface 239 is sandwiched between the right case half 237 and the left case half 238.

The pump shaft 291 is hermetically and rotatably supported on a support sleeve shaft 296 which is formed on the right case half 238, while a second driven gear 297 is fixed to an outer end portion of the pump shaft 291 which projects from the support sleeve portion 296. On the other hand, a third drive gear 298 is fixed to another end portion of the balancer shaft 275 and the pump shaft 291 is rotatably driven by allowing the third drive gear 298 to be meshed with a second driven gear 297.

At a portion of the right side half 237 which faces the mating surface 239, a discharge-side recessed portion 299 which is in communication with the pump chamber 294 and an intake-side recessed portion 2100 which is in communication with the pump chamber 294 are formed such that an inner end portion of the pump shaft 291 is received by the right case half 237 between both recessed portions 299, 2100.

On the other hand, in the left case half 238, an oil discharge passage 2101 which has one end thereof opened at the mating surface 239 in a state wherein the oil discharge passage 2101 is in communication with the discharge-side recessed portion 299 that is formed so as to supply oil to respective lubrication portions of the engine.

Further, the intake-side recessed portion 2100 and a lower portion of the crankcase 231 are in communication with each other by an oil intake passage 2102, while a passage groove 2103 which forms the oil intake passage 2102 between the right and left case halves 237, 238 which sandwich the mating surface 239 is formed in at least one of both case halves 237, 238. In this embodiment, the passage groove 2103 is formed in the left case half 238.

A start manipulation force which corresponds to a kicking manipulation can be inputted to the clutch gear 264 by way of a kicking start gear train 2105. The kicking start gear train 2105 includes a fourth drive gear 2107 which is mounted on a kicking shaft 2106 which is rotatably supported on the crankcase 231, an idle gear 2108 which is fixed to the counter shaft 253 and is meshed with the fourth drive gear 2107, and a third driven gear 2109 which is relatively rotatably supported on the main shaft 2252 and is meshed with an idle gear 2108, wherein the input member 261 of the speed change clutch 260 is mounted on the third driven gear 2109 in a relatively non-rotatable manner.

The fourth drive gear 2107 is supported on the kicking shaft 2106 such that the fourth drive gear 2107 is rotatable but is not relatively movable in the axial direction with respect to the kicking shaft 2106. Between the kicking shaft 2106 and the fourth drive gear 2107 a one-way clutch mechanism 2110 is provided for connecting both the kicking shaft 2106 and the fourth drive gear 2107 when the kicking shaft 2106 is rotated in the normal direction.

This one-way clutch mechanism 2110 includes a clutch body 2111 which is fitted on the kicking shaft 2106 in an axially relatively movable manner and a relatively non-rotatable manner and a friction spring 2112 which imparts a frictional resistance to the rotation of the clutch body 2111. On surfaces of the fourth drive gear 2107 and the clutch body 2111 which face each other, ratchet teeth 2113, 2114 are formed which transmit only the normal rotation of the clutch body 2111, that is, the rotation of the kicking shaft 2106 at the time of meshing.

Further, between the right case half 237 and the kicking shaft 2106, kicking return springs 2115, 2115 which are formed of a torsional coil spring are arranged in an inner-and-outer duplicate manner. Due to the provision of these kicking return springs 2115, 2115, the kicking shaft 2106 is spring-biased to the return side.

Figure 12:
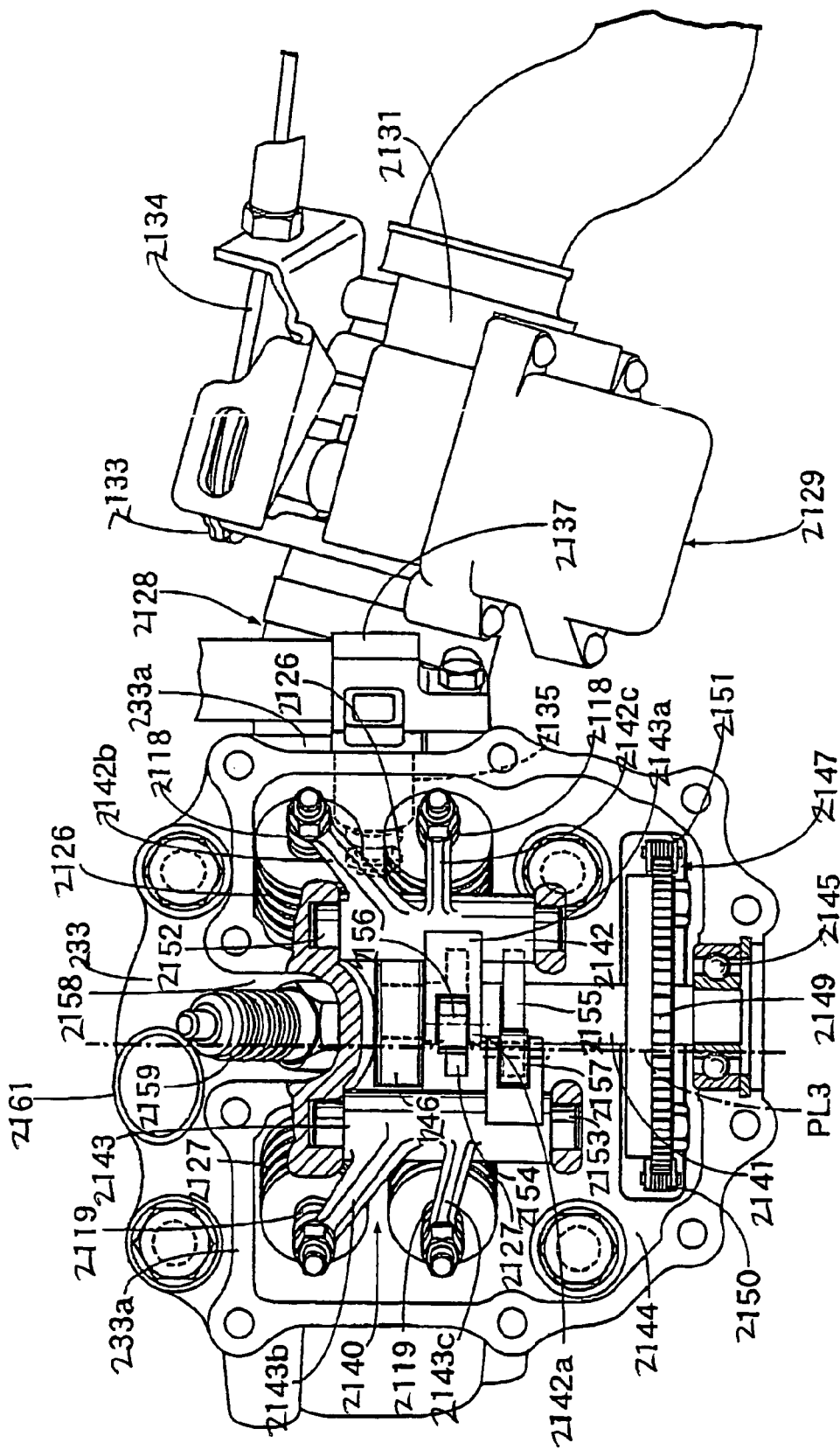
FIG. 12 is a plan view with a part broken away as viewed from the direction of an arrow 6 in FIG. 11 in a state that a head cover is omitted.
Figure 13:
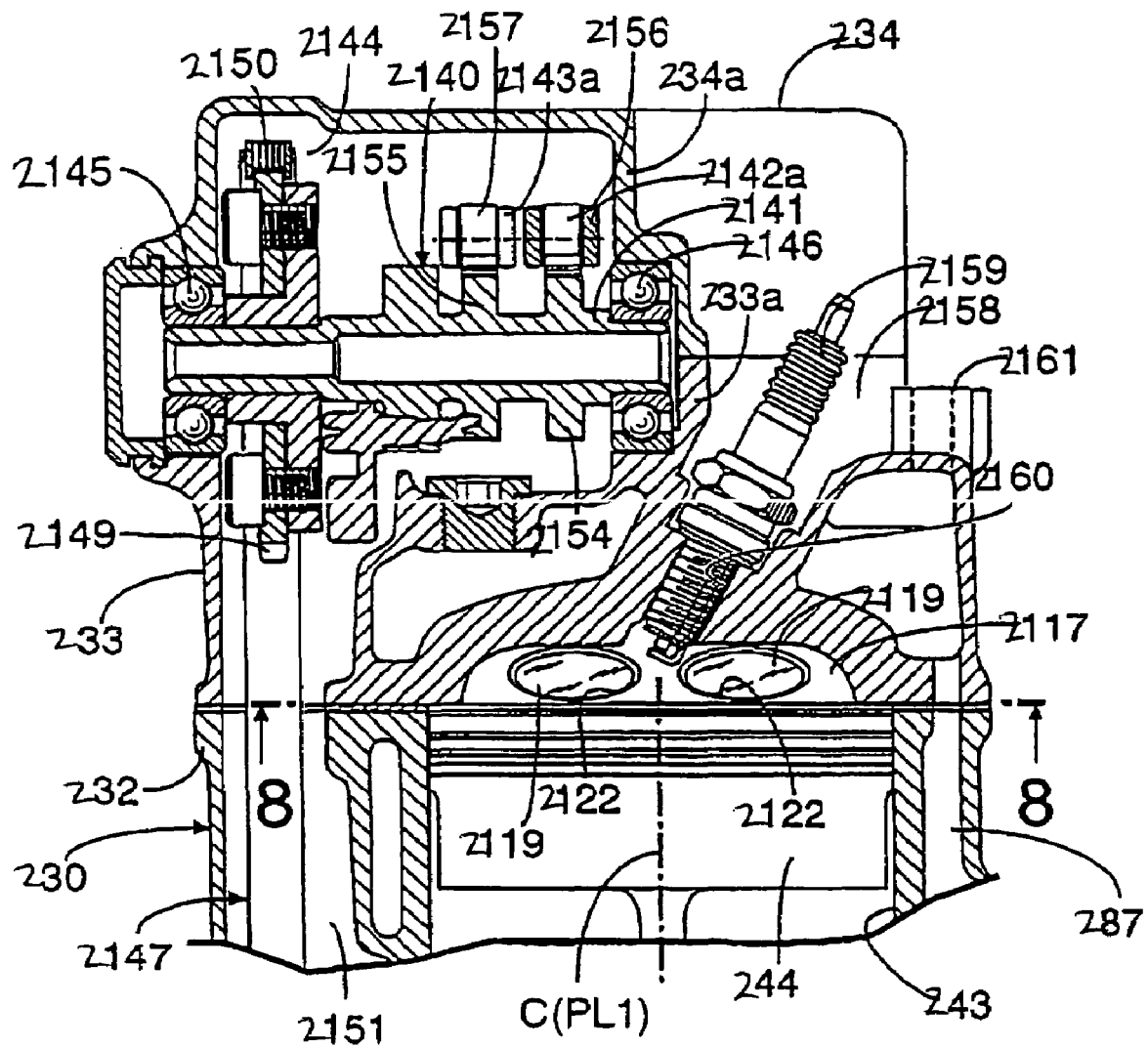
FIG. 13 is a cross-sectional view taken along a line 7-7 in FIG. 12.

To explain further in conjunction with FIGS. 12 and 13, between the cylinder block 232 and the cylinder head 233, a combustion chamber 2117 is formed with a top portion of the piston 244. Further, in the cylinder head 233, with respect to a projection view to a first plane PL1, a plane parallel to FIG. 11, which includes an axis of the cylinder bore 243, that is, the cylinder axis C, a plurality of (a pair of in this case) intake valves 2118 and exhaust valves 2119 for respective sides are arranged such that their operational axes cross in an approximately V-shape and they can be operated to be opened and closed.

In the cylinder head 233, a pair of intake valve openings 2120 face the combustion chamber 2117 such that the intake valve openings 2120, respectively, are opened or closed by the respective intake valves 2118. A single intake port 2121 is provided which is in communication with both intake valve openings 2120 in common. The single intake port 2121 opens at a rear side wall of the cylinder head 233. A pair of exhaust valve openings 2122 are provided which face the combustion chamber 2117 such that the exhaust valve openings 2122 are respectively opened or closed by the respective exhaust valves 2119. A single discharge port 2123 is provided which is in communication with both exhaust valve openings 2120 in common. The single discharge port 2121 opens at a front side wall of the cylinder head 233.

Further, the cylinder head 233 is provided with a pair of intake-side guide sleeves 2124 which allow both intake valves 2118 to be slidably fitted therein so as to guide the opening-closing operation of both intake valves 2118 and a pair of exhaust-side guide sleeves 2125 allow both exhaust valves 2119 to be slidably fitted therein so as to guide the opening-closing operation of both exhaust valves 2119. Between the upper end portions of both intake valves 2118 which project from the intake-side guide sleeves 2124 and the cylinder head 233, valve springs 2126 are interposed which bias the respective intake valves 2118 in the valve closing direction. In addition, between the upper end portions of both exhaust valves 2119 which project from the exhaust-side guide sleeves 2125 and the cylinder head 233, valve springs 2127 are interposed which bias the respective exhaust valves 2119 in the valve closing direction.

With the rear side wall of the cylinder head 233, a connecting sleeve portion 2138 which projects outwardly relative to a coupled portion between the cylinder head 233 and the head cover 234 and forms an inlet portion 2121a of the intake port 2121 is integrally formed in a state wherein an axis of the inlet portion 2121a is arranged in a second plane PL2 which is substantially orthogonal to the cylinder axis C.

A throttle body 2129 is connected to the connecting sleeve portion 2138 by way of an insulator 2128. Here, the insulator 2128 is formed by adhering a flange 2128b to a downstream end of a sleeve portion 2128a made of rubber by baking, wherein the flange 2128b is bonded to the connecting sleeve portion 2138. The throttle body 2129 which is connected to an upstream end portion of the insulator 2128 is configured such that in a body 2131 having an intake passage 2130 leading to the intake port 2121, a throttle valve 2132 which is capable of controlling a flow area of the intake passage 2130 is arranged in a state wherein the throttle valve 2132 can be opened and closed.

Further, the sleeve portion 2128a of the insulator 2128 is formed to be bent in the above-mentioned second plane PL2, while the throttle body 2129 is connected to an upstream end portion of the insulator 2128 such that the intake passage 2130 is arranged on the second plane PL2. Further, the throttle body 2129 is arranged outside of the body 2131 such that the throttle body 2129 is integrally rotatable with the throttle valve 2132 and, at the same time, the throttle body 2129 is provided with a throttle drum 2133 around which a throttle wire 2134 is wound and to which the throttle wire 2134 is connected. In a posture wherein the throttle drum 2133 is arranged at a side opposite to the cylinder head 233, the throttle body 2129 is connected to the cylinder head 233 by way of the insulator 2128.

Here, a fuel injection valve 2135 which injects fuel toward the intake port 2121 is mounted on the cylinder head 233. In the connecting sleeve portion 2138 of the cylinder head 233, a mounting hole 2136 which allows the hermetic fitting of a distal end portion of the fuel injection valve 2135 therein is formed, while a rear end portion of the fuel injection valve 2135 which allows the distal end portion to be hermetically fitted in the mounting hole 2136 is fitted in a holder 2137 which is fastened to the cylinder head 233. That is, the fuel injection valve 2135 is mounted on the cylinder head 233 such that the fuel injection valve 2135 is sandwiched between the cylinder head 233 and the holder 2137. Fuel is supplied from the holder 2137 to the fuel injection valve 2135.

Here, a valve actuating device 2140 for performing an opening-closing drive for each pair of intake valves 2118 and the exhaust valves 2119 includes a cam shaft 2141 which is arranged between both intake valves 2118 and both exhaust valves 2119 while having an axis thereof which is substantially perpendicular to the axis of the inlet portion 2121a of the intake port 2121, an intake-side rocker arm 2142 which is tilted in response to the rotation of the cam shaft 2141 and performs the opening-closing drive of both intake valves 2118 and an exhaust-side rocker arm 2143 which is tilted in response to the rotation of the cam shaft 2141 and performs the opening-closing drive of both exhaust valves 2119. The valve actuating device 2140 is housed in a valve actuating chamber 2144 formed between the cylinder head 233 and the head cover 234 which is connected to the cylinder head 233.

Both end portions of the cam shaft 2141 are rotatably supported between the coupled surfaces of the cylinder head 233 and the head cover 234 by way of ball bearings 2145, 2146 and a rotational force of the crankshaft 236 is transmitted to one end portion of the cam shaft 2141 by way of a timing transmission device 2147.

The timing transmission device 2147 includes a drive sprocket wheel 2148, see FIG. 10, which is integrally formed with a portion of the crankcase 231 which projects from the left case half 238 in the crankshaft 236, a driven sprocket wheel 2149 which is fixed to one end portion of the cam shaft 2141 and a cam chain 2150 which is wound around the drive sprocket wheel 2148 and the driven sprocket wheel 2149. A chain chamber 2151 which houses the traveling cam chain 2150 is formed in a passage ranging from the crankcase 231 to the cylinder head 233 by way of the cylinder block 232.

At both sides of the cam shaft 2141, an intake-side rocker shaft 2152 and an exhaust-side rocker shaft 2153 are arranged while having respective axes thereof parallel to the camshaft 2141. Both end portions of the rocker shafts 2152, 2153 are fixedly supported in a state that both end portions are sandwiched between the cylinder head 233 and the head cover 234.

The intake-side rocker arm 2142 is tiltably supported on the intake-side rocker shaft 2152 and is integrally provided with an arm 2142a which pivotally supports a roller 2156 which comes into rolling contact with an intake-side cam 2154 formed on the cam shaft 2141 and arms 2142b, 2142c which bring distal end portions thereof into contact with upper end portions of both intake valves 2118. Further, the exhaust-side rocker arm 2143 is tiltably supported on the exhaust-side rocker shaft 2153 and is integrally provided with an arm 2143a which pivotally supports a roller 157 which comes into rolling contact with an exhaust-side cam 2155 formed on the cam shaft 2141 and arms 2143b, 2143c which bring distal end portions thereof into contact with upper end portions of both exhaust valves 2119.

The cam shaft 2141 is arranged at an offset position at the chain chamber 2151 side such that another end portion thereof, that is, a portion thereof which is supported on the cylinder head 233 and the head cover 234 by way of the ball bearing 2146 is made to substantially correspond to the center portion of the combustion chamber 2117. Further, a peripheral wall of the valve actuating chamber 2144 is formed of valve actuating chamber forming walls 233a, 234a which are formed on the cylinder head 233 and the head cover 234. A recessed portion 2158 is formed out of the valve actuating chamber forming walls 233a, 234a, in a portion thereof which corresponds to another end portion of the cam shaft 2141.

On the other hand, an ignition plug 2159 which has a distal end thereof facing the approximately center portion of the combustion chamber 2117 and a rear end portion thereof arranged in the recessed portion 2158 is mounted on the cylinder head 233 in an inclined manner such that a rear end side thereof is shifted away from the chain chamber 2151. A plug mounting hole 2160 is formed in the cylinder head 233 for mounting the ignition plug 2159.

Here, the cylinder head 233 is provided with a cooling water lead-out pipe portion 2161 for leading out cooling water from the cooling jacket 287 and the cooling water lead-out pipe portion 2161 and the radiator 286 are connected to each other by way of a hose 2162, see FIG. 7.

Further, the cooling water lead-out pipe portion 2161 is connected to the cylinder head 233 such that the cooling water lead-out pipe portion 2161 is arranged at a side opposite to the chain chamber 2151 and outside the valve actuating chamber forming walls 233a, 234a and, at the same time, extends substantially parallel to the cylinder axis C at a position offset to either one side of the intake valve 2118 and the exhaust valve 2119, in this embodiment, at a position offset to the exhaust valve 2119 side from the recessed portion 2158.

Further, an angle α1 which the operation axis of the exhaust valve 2119 . . . which is disposed closer to the cooling water lead-out pipe portion 2161 out of the intake valve 2118 and the exhaust valve 2119 makes with respect to the cylinder axis C on a projection view to the first plane PL1 is set smaller than an angle α2 which an operation axis of the intake valve 2118 which constitutes another valve makes with respect to the cylinder axis C on the projection view.

Figure 14:
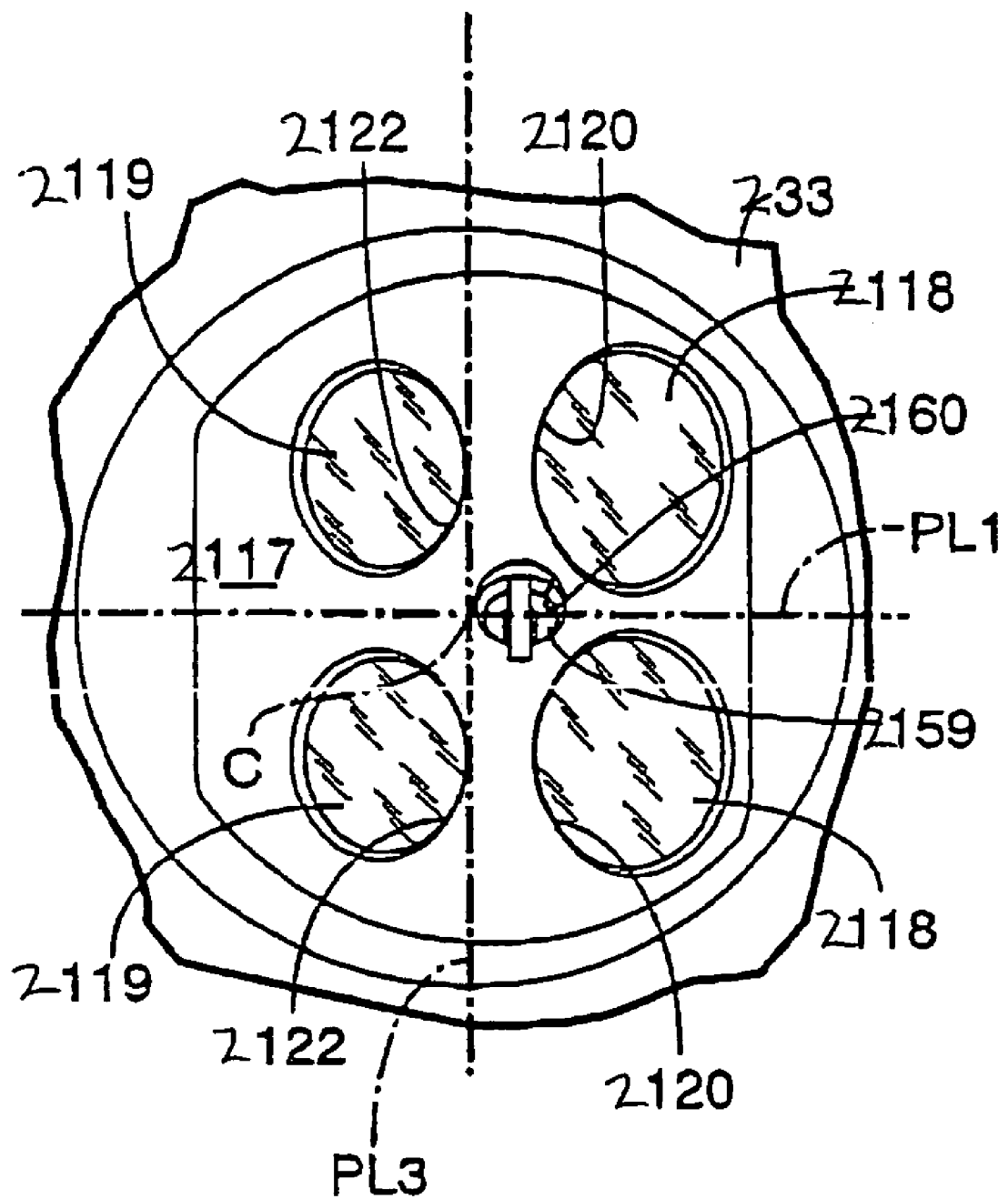
FIG. 14 is a bottom view of an essential part of a cylinder head along a line 8-8 in FIG. 13.

Further, as shown in FIG. 14 an opening portion of plug mounting hole 2160 leading to the combustion chamber 2117 is arranged offset to the intake valve 2118 side from the cylinder axis C. A distance between the opening portion of plug mounting hole 2160 leading to the combustion chamber 2117 and the intake valve openings 2120 which face the combustion chamber 2117 and are formed in the cylinder head 233 is set smaller than a distance between the exhaust valve openings 2122 which face the combustion chamber 2117 and are formed in the cylinder head 233 and the opening portion of the plug mounting hole 2160.

Further, the axis of the cam shaft 2141 in the valve actuating device 2140 is arranged offset to a side opposite to the cooling water lead-out pipe portion 2161 than the third plane PL3 which is parallel to the cam shaft 2141 and includes the cylinder axis C.

Here, the throttle body 229 is connected with an air cleaner 2165 which is arranged behind the throttle body 2129 and is supported on the vehicle body frame 211. As described above, the cylinder head 233 of the engine E which is formed in a SOHC type, the fuel injection valve 2135 and the throttle body 2129 are arranged between a pair of left and right main frames 213, 213 provided to the vehicle body frame 211.

Further, an exhaust pipe 2166 which has an upstream end thereof connected with the exhaust port 2123 of the cylinder head 233 extends rearwardly at the right side of the engine body 230, while the exhaust pipe 2166 has a downstream end thereof connected to an exhaust muffler 2167 arranged at the right side and above the rear wheel WR.

Next, to explain the manner of operation of this embodiment, the pair of intake valves 2118 and the pair of exhaust valves 2119. which are operable to be opened and closed are arranged in the cylinder head 233 such that operational axes thereof intersect in an approximately V-shape on the projection view to the first plane PL1 which includes the cylinder axis C. Further, the valve actuating device 2140 which performs the opening-closing drive of both intake valves 2118 and both exhaust valves 2119 has an axis which is orthogonal to the first plane PL1 and is arranged between both intake valves 2118 and both exhaust valves 2119 and, at the same time, includes the cam shaft 2141 to which the rotational force is inputted by way of the timing transmission device 2147 at one end portion thereof from the crankshaft 236. Here, the cam shaft 2141 is arranged at the position offset to the chain chamber 2151 side which houses the cam chain 2150 of the timing transmission device 2147 such that the cam shaft 2141 makes another end portion thereof corresponding to the center portion of the combustion chamber 2117. Further, out of the valve actuating chamber forming walls 233a, 234a which are provided relative to the cylinder head 233 and the head cover 234 such that they form the peripheral wall of the valve actuating chamber 2144 which houses the valve actuating device 2140, in a portion of the walls 233a, 234a which corresponds to another end portion of the cam shaft 2141, the recessed portion 2158 is formed. Further, the ignition plug 2159 has a distal end portion thereof facing the approximately center portion of the combustion chamber 2117 and is arranged wherein the rear end portion in the recessed portion 2158 is mounted on the cylinder head 233 in an inclined manner such that the rear end side thereof is shifted away from the chain chamber 2151.

Accordingly, it is possible to arrange the ignition plug 2159 in the recessed portion 2158 which is formed in the valve actuating chamber forming walls 233a, 234a corresponding to a vacant space formed by offsetting the cam shaft 2141 toward the chain chamber 2151 side while obviating the interference of the cam shaft 2141 with the valve actuating chamber 2144.

While the cooling water lead-out pipe portion 2161 for leading out the cooling water from the cooling jacket 287 is provided to the cylinder head 233, the cooling water lead-out pipe portion 2161 which is arranged at the side opposite to the chain chamber 2151 and outside the valve actuating chamber forming walls 233a, 234a and, at the same time, is offset to the side of either one of the intake valve 2118 and the exhaust valve 2119 from the recessed portion 2158, that is, offset to the exhaust valve 2119 side in this embodiment, is provided to the cylinder head 233 such that the cooling water lead-out pipe portion 2161 extends substantially parallel to the cylinder axis C.

Accordingly, it is possible to provide the cooling water lead-out pipe portion 2161 which extends substantially parallel to the cylinder axis C to the cylinder head 233 in a state wherein the engine can be miniaturized around the cylinder head 233 while ensuring the maintenance property of the ignition plug 2159.

Further, the angle α1 which the operation axis of the exhaust valve 2119 . . . which is closer to the cooling water lead-out portion 2161 out of the intake valve 2118 and the exhaust valve 2119 makes with respect to the cylinder axis C on the projection view to the first plane PL1 is set smaller than the angle α2 which the operation axis of the intake valve 2118 makes with respect to the cylinder axis C on the projection view, and the opening portion toward the combustion chamber 2117 of the plug mounting hole 2160 formed in the cylinder head 233 for mounting the ignition plug 2159 is arranged in an offset manner toward the intake valve 2118 side from the cylinder axis C. That is, the distance between the opening portion toward the combustion chamber 2117 of the plug mounting hole 2160 and the plurality of intake valve openings 2120 which are formed in the cylinder head 233 in a state wherein they face the combustion chamber 2117 and are opened or closed by the respective intake valves 2118 is set smaller than the distance between the plurality of exhaust valve openings 2122 which are formed in the cylinder head 233 in a state wherein they face the combustion chamber 2117 and are opened or closed by the respective exhaust valves 2119 and the opening portion of the plug mounting hole 2160.

Accordingly, out of the intake valves 2118 and the exhaust valves 2119, between the valve shaft of the exhaust valves 2119 closer to the cooling water lead-out pipe portion 2161 and the ignition plug 2159, a cooling passage area of the cooling water jacket 287 can be set to a relatively large value. Thus, cooling water is led out from the cooling jacket 287 at the side close to the exhaust valve 2119 whereby it is possible to enhance the cooling performance of the cylinder head 233 in the periphery of the exhaust valve 2119 along with the increase of a flow speed of the cooling water in the periphery of the exhaust valve 2119.

Further, the axis of the cam shaft 2141 is arranged to be offset to a side opposite to the cooling water lead-out pipe portion 2161 than the third plane PL3 which is parallel to the axis of the cam shaft 2141 and includes the cylinder axis C. Accordingly, the angle which the operating axis of the exhaust valves 2119, which are valves arranged close to the cooling water lead-out pipe portion 2161, makes with respect to the cylinder axis C can be set to a smaller value by obviating the interference of the cooling water lead-out pipe portion 2161 with the cam shaft 2141 whereby the cooling performance of the exhaust valves 2119 which are the valves close to the cooling water lead-out pipe portion 2161 can be further enhanced.

Further, the connecting sleeve portion 2138 which projects outwardly relative to the coupled portion between the cylinder head 233 and the head cover 234 and forms the inlet portion 2121a of the intake port 2121 is integrally formed in the cylinder head 233 in a state wherein the axis of the inlet portion 2121a is arranged in the second plane PL2 which is substantially orthogonal to the cylinder axis C. The mounting hole 2136 which allows the hermetic fitting of the distal end portion of the fuel injection valve 2135 which is mounted on the cylinder head 33 such that the fuel is injected toward the intake port 2121 therein is formed in the connecting sleeve portion 2138. Further, the throttle body 2129 is connected to the connecting sleeve portion 2138 by way of the insulator 2128 in a state wherein the axis of the intake passage 2130 is arranged on the second plane PL2.

According to such a mounting structure of the fuel injection valve 2135, it is possible to expose most of the portion of the throttle body 2129 except for the distal end portion of the fuel injection valve 2135 to the outside of the cylinder head 233 while arranging the throttle body 2129 close to the cylinder head 233. Thus, the whole engine E including the throttle body 2129 can be miniaturized whereby the effective cooling of the fuel injection valve 2135 can be realized.

Further, the insulator 2128 is formed such that the insulator 2128 is bent in the inside of the second plane PL2, and the throttle drum 2133 which is provided to the throttle valve 2129 is arranged at a side opposite to the cylinder head 233. Due to such a construction, it is possible to arrange the throttle body 2129 close to the cylinder head 233 side and, at the same time, there is no possibility that the fuel injection valve 2135 obstructs the arrangement of a throttle wire 2134 which is wound around the throttle drum 2133.

The engine E is formed as an SOHC type such that the intake valve 2118 and the exhaust valve 2119 which are operable to be opened and closed are arranged in the cylinder head 233 such that operational axes thereof intersect in an approximately V-shape on the projection view to the first plane PL1 which includes the cylinder axis C and the axis of the inlet portion 2121a of the intake port 2121, and the cam shaft 2141 having the axis which is substantially parallel to the axis of the inlet portion 2121a of the intake port 2121 is arranged between the intake valves 2118 and the exhaust valves 2119. Due to such a construction, it is possible to decrease the width of the upper portion of the cylinder head 233 as much as possible. Thus, the projecting portion of the fuel injection valve 2135 from the cylinder head 233 can be increased whereby it is possible to cool the fuel injection valve 2135 more effectively.

Further, the cylinder head 233 of the engine E having the single cylinder, the fuel injection valve 2135 and the throttle body 2129 are arranged between a pair of left and right main frames 213, 213 of the vehicle body frame 211. Due to such a construction, it is possible to arrange the fuel injection valve 2135 and the throttle body 2129 while narrowing the distance between the pair of left and right main frames 213, 213 and this contributes to the enhancement of the saddling property and riding comfortableness of a rider.

Although the embodiments of the present invention have been explained heretofore, the present invention is not limited to the above-mentioned embodiments and various design changes can be made without departing from the present invention described in claims.

As described above, according to the present invention, it is possible to expose most of the portion of the throttle body except for the distal end portion of the fuel injection valve while arranging the throttle body close to the cylinder head. Thus, the whole engine including the throttle body can be miniaturized whereby the effective cooling of the fuel injection valve can be realized.

Further, according to the present invention, the insulator is bent. Thus, it is possible to arrange the throttle body close to the cylinder head side and, at the same time, there is no possibility that the fuel injection valve obstructs the arrangement of a throttle wire which is wound around the throttle drum.

Further, according to the present invention, it is possible to decrease the width of the upper portion of the cylinder head as much as possible. Thus, the projecting portion of the fuel injection valve from the cylinder head can be increased whereby it is possible to cool the fuel injection valve more effectively.

Further, according to the present invention, it is possible to arrange the fuel injection valve and the throttle body while narrowing the distance between the pair of left and right main frames provided to the small motorcycle and this contributes to the enhancement of saddling property and riding comfortableness of a rider.

Although one embodiment of the layout structure of a fuel injection device in a motorcycle according to the present invention has been explained heretofore, the present invention is not limited to such a constitution and various design changes may be made without departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection type engine for a motorcycle, comprising:
   a cylinder having a cylinder axis which is arranged substantially in a vertical direction;
   a cylinder head arranged above the cylinder and having an intake port formed therein;
   a head cover;
   a connecting sleeve portion projecting rearwardly relative to a joint portion of the cylinder head and the head cover, the connecting sleeve portion forming an inlet portion of the intake port;
   a throttle body having an intake passage leading to the intake port;
   an insulator provided between the throttle body and the connecting sleeve portion for connecting the throttle body to the connecting sleeve portion;
   a fuel injection valve for injecting fuel toward the intake port;
   wherein the connecting sleeve portion is integrally formed with a rear side of the cylinder head in a manner such that the insulator and the throttle body are arranged rearward of the cylinder head, and
   wherein each of the intake port, the insulator, and the throttle body has an axis that is arranged on a plane (PL2) which is substantially horizontal,
   the axis (L3) of the intake port extending in a direction which is parallel to a lengthwise direction (LL) of the motorcycle, and
   the axis (L2) of the throttle body extending in a direction at an angle relative to the lengthwise direction (LL) of the motorcycle, so that a rear end of the throttle body is offset to one side of a cushion unit.

2. The fuel injection type engine for a motorcycle according to claim 1, wherein the insulator is formed with a curve, and the curve is arranged on the plane (PL2), and
   further comprising a throttle drum arranged outwardly from the body of the intake passage, the throttle drum adapted to rotate together with the throttle valve, the throttle drum being arranged on one side of the intake passage body, and the throttle body being arranged at opposite side of the intake passage body.

3. The fuel injection type engine for a motorcycle according to claim 1, further comprising:
   an intake valve and an exhaust valve operable to be opened and closed;
   a valve actuating device with a camshaft; and
   a valve actuating chamber;
   wherein the intake valve and the exhaust valve are arranged in the cylinder head such that an operational axes thereof intersect in an approximately V-shape on a projection view to a plane (PL1) which includes the cylinder axis and an axis of an inlet portion of the intake port,
   wherein the valve actuating device which has an axis substantially perpendicular to an axis of the inlet portion of the intake port, and
   wherein the camshaft is arranged between the intake valve and the exhaust valve is housed in a valve actuating chamber which is formed between the cylinder head and the head cover jointed to the cylinder head.

4. The fuel injection type engine for a motorcycle according to claim 1, wherein the pair of left and right frame members overlap substantially all of the throttle body and the fuel injection valve when the motorcycle is viewed in side view.

5. The fuel injection type engine for a motorcycle according to claim 1, wherein upper parts of the throttle body are lower than a upper part of the cylinder head, thereby contributing to an enhanced saddling property and riding comfort.

6. The fuel injection type engine for a motorcycle according to claim 1, wherein a height (H1) of a top portion of the fuel injection valve and a height (H2) of a top portion of the cylinder head are substantially equal.

7. The fuel injection type engine for a motorcycle according to claim 1, wherein the fuel injection valve is arranged in a state that a top portion of the fuel injection valve projects above the pair of left and right main frames, and the top portion is disposed close to a back surface of a vehicle body cover.

8. The fuel injection type engine for a motorcycle according to claim 1, wherein the fuel injection valve is arranged such that an axis (L1) makes an acute angle with respect to the axis (L2) of the throttle body, and such that a top portion of the fuel injection valve extends above a portion of the throttle body.

9. The fuel injection type engine for a motorcycle according to claim 1, further comprising an ECU integrally mounted on an upper portion of the throttle body, the ECU being adapted to compute a fuel injection quantity of the fuel injection valve.

10. The fuel injection type engine for a motorcycle according to claim 1, wherein the rear cushion is disposed rearwardly of the engine, and
    the distance between portions of the left and right frame members adjacent to left and right sides to the engine is smaller than is larger the distance between portions of the left and right frame members adjacent to left and right sides of the rear cushion.

11. The fuel injection type engine for a motorcycle according to claim 1,
    wherein the insulator is bent,
    a forward end of the insulator connecting to the intake port, the axis (L3) of which is parallel to the lengthwise direction (LL) of the motorcycle, and
    a rear end of the insulator connecting to the throttle body, the axis (L2) of which extends in the direction at the angle to the lengthwise direction (LL) of the motorcycle.

12. The fuel injection type engine for a motorcycle according to claim 1, further comprising:
a throttle valve capable of controlling a flow area of the intake passage of the throttle body such that the throttle valve is operable to be opened and closed.

13. The fuel injection type engine for a motorcycle according to claim 1,
wherein the connecting sleeve portion of the cylinder head includes a mounting hole adapted to receive a distal end portion of the fuel injection valve such that the fuel injection valve is capable of injecting fuel towards the intake port, the fuel injection valve being hermetically fitted in to the mounting hole,
wherein the engine is mounted on a vehicle body frame that includes the pair of left and right frame members, a rear cushion is interposed between a rear fork and the vehicle body frame, and
wherein a distance between the pair of left and right frame members is enlarged from a front of the engine to the rear cushion.

14. The fuel injection type engine for a motorcycle according to claim 1, wherein a rear end of the throttle body is connected to an air cleaner at a position directly under the seat of the motorcycle.

15. A fuel injection type engine, comprising:
a cylinder head having an intake port formed therein;
a throttle body having an intake passage leading to the intake port in a body thereof;
a throttle valve capable of controlling a flow area of the intake passage in the body such that the throttle valve is operable to be opened and closed;
a fuel injection valve for injecting fuel toward the intake port;
wherein a connecting sleeve portion projects further outwardly relative to a joint portion of the cylinder head and a head cover and forms an inlet portion of the intake port that is integrally formed with the cylinder head, and a distal end portion of the fuel injection valve is hermetically fitted into a mounting hole of the connecting sleeve portion, such that the fuel injection valve injects fuel towards the intake port, said mounting hole being formed in the connecting sleeve portion, and the throttle body is connected to the connecting sleeve portion with an insulator, and
wherein the throttle body is arranged on an upper side of a transmission (M) of the engine, an axis of the inlet portion of the intake port which is integrally formed with the cylinder head is arranged on a plane (PL2) which is substantially orthogonal to a cylinder axis (C), and an axis of the intake passage of the throttle body is arranged on the plane (PL2), wherein the insulator is formed such that it is bent to one side in order to avoid interference between the throttle body and the rear cushion, and the insulator is arranged on the plane (PL2).

16. The fuel injection type engine according to claim 15, wherein an intake valve and an exhaust valve are operable to be opened and closed and are arranged in the cylinder head such that operational axes thereof intersect in an approximately V-shaped on a projection view to a plane (PL2) which includes the cylinder axis (C) and an axis of an inlet portion of the intake port, and a valve actuating device which has an axis substantially parallel to an axis of the inlet portion of the intake port and has a camshaft which is arranged between the intake valve and the exhaust valve is housed in a valve actuating chamber which is formed between the cylinder head and the head cover jointed to the cylinder head.

17. The fuel injection type engine according to claim 15, wherein the engine is mounted on a vehicle body frame, and a rear cushion is interposed between a rear fork and the vehicle body frame, and
wherein the throttle body is arranged between the cylinder head and the rear cushion and the insulator is bent to avoid interfering with the rear cushion.

18. The fuel injection type engine according to claim 16, wherein the engine is mounted on a vehicle body frame, and a rear cushion is interposed between a rear fork and the vehicle body frame, and
wherein the throttle body is arranged between the cylinder head and the rear cushion and the insulator is bent to avoid interfering with the rear cushion.

19. The fuel injection type engine according to claim 15, wherein a throttle drum which is arranged outwardly from the body and is integrally rotated with the throttle valve is arranged at a side opposite to the cylinder head.

20. The fuel injection type engine according to claim 16, wherein a throttle drum which is arranged outwardly from the body and is integrally rotated with the throttle valve is arranged at a side opposite to the cylinder head.

21. The fuel injection type engine according to claim 17, wherein a throttle drum which is arranged outwardly from the body and is integrally rotated with the throttle valve is arranged at a side opposite to the cylinder head.

22. The fuel injection type engine according to claim 18, wherein a throttle drum which is arranged outwardly from the body and is integrally rotated with the throttle valve is arranged at a side opposite to the cylinder head.

* * * * *